(12) United States Patent
Gulwani et al.

(10) Patent No.: US 9,552,335 B2
(45) Date of Patent: Jan. 24, 2017

(54) EXPEDITED TECHNIQUES FOR GENERATING STRING MANIPULATION PROGRAMS

(75) Inventors: Sumit Gulwani, Bellevue, WA (US); Rishabh Singh, Cambridge, MA (US); Dany Rouhana, Redmond, WA (US); Benjamin G. Zorn, Woodinville, WA (US); Weide Zhong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1138 days.

(21) Appl. No.: 13/487,266

(22) Filed: Jun. 4, 2012

(65) Prior Publication Data

US 2013/0326475 A1 Dec. 5, 2013

(51) Int. Cl.
*G06F 9/44* (2006.01)
*G06F 17/22* (2006.01)
*G06F 9/45* (2006.01)

(52) U.S. Cl.
CPC ................. *G06F 17/22* (2013.01); *G06F 8/30* (2013.01); *G06F 8/427* (2013.01)

(58) Field of Classification Search
None
See application file for complete search history.

(56) References Cited

U.S. PATENT DOCUMENTS 5,790,760 A 8/1998 Arima
5,920,717 A 7/1999 Noda
(Continued)

FOREIGN PATENT DOCUMENTS

| CN | 1400547 | 3/2003 |
|---|---|---|
| CN | 101639861 | 2/2010 |
| WO | WO-2010088523 | 8/2010 |

OTHER PUBLICATIONS

Gulwani , Automating String Processing in Spreadsheets Using Input-Output Examples, Jan. 2011, ACM, In Proceedings of the 38th annual ACM SIGPLAN-SIGACT symposium on Principles of programming languages (POPL '11), pp. 317-330.*

(Continued)

*Primary Examiner* — Lewis A Bullock, Jr.
*Assistant Examiner* — Melissa Alfred
(74) *Attorney, Agent, or Firm* — Steve Wight; Sandy Swain; Micky Minhas

(57) ABSTRACT

A program creation system is described which generates sets of subprograms for respective input-output examples. The program creation system then groups the sets into partitions by performing an intersection operation. According to one aspect, the program creation system generates subprograms so as to exclude tokens that are not represented by the input strings of the input-output examples. According to another aspect, the program creation system first generates the subprograms without attempting to generate loop-type expressions. If this operation produces unsatisfactory results, the program creation system repeats its processing, this time including loop-type expressions. According to another aspect, the program creation system performs the grouping operation using an expedited graph-intersection operation. According to another aspect, the program creation system ranks programs (which are created based on the results of the grouping operation) based on the presence of preferred features found in the programs.

13 Claims, 20 Drawing Sheets

(56) References Cited

U.S. PATENT DOCUMENTS

| | | | |
|---|---|---|---|
| 6,035,302 | A | 3/2000 | Tonouchi |
| 6,327,699 | B1 | 12/2001 | Larus et al. |
| 6,484,310 | B1 | 11/2002 | Przybylski et al. |
| 6,882,999 | B2 | 4/2005 | Cohen et al. |
| 6,963,871 | B1 | 11/2005 | Hermansen et al. |
| 7,010,779 | B2 | 3/2006 | Rubin et al. |
| 7,155,683 | B1 | 12/2006 | Williams |
| 7,165,019 | B1 | 1/2007 | Lee et al. |
| 7,433,885 | B2 | 10/2008 | Jones |
| 7,676,444 | B1 | 3/2010 | Venkatachary et al. |
| 7,979,268 | B2 | 7/2011 | Lee |
| 8,175,875 | B1 | 5/2012 | Dean et al. |
| 8,799,234 | B2 | 8/2014 | Gulwani et al. |
| 8,972,930 | B2 | 3/2015 | Gulwani |
| 2002/0069220 | A1 | 6/2002 | Tran |
| 2003/0004874 | A1 | 1/2003 | Ludwig et al. |
| 2004/0158810 | A1 | 8/2004 | Dove et al. |
| 2005/0080755 | A1 | 4/2005 | Aoyama |
| 2005/0149536 | A1 | 7/2005 | Wildes et al. |
| 2005/0182629 | A1 | 8/2005 | Coorman et al. |
| 2005/0228640 | A1 | 10/2005 | Aue et al. |
| 2005/0246681 | A1 | 11/2005 | Little et al. |
| 2007/0055493 | A1 | 3/2007 | Lee |
| 2008/0282108 | A1 | 11/2008 | Jojic et al. |
| 2009/0049354 | A1 | 2/2009 | Buckley, Jr. et al. |
| 2009/0077542 | A1 | 3/2009 | Chou et al. |
| 2009/0106710 | A1 | 4/2009 | Teig et al. |
| 2009/0119416 | A1* | 5/2009 | Sirdevan et al. ............ 709/246 |
| 2009/0119584 | A1* | 5/2009 | Herbst ......................... 715/273 |
| 2009/0132477 | A1 | 5/2009 | Zuev et al. |
| 2009/0210418 | A1 | 8/2009 | Arasu et al. |
| 2009/0226081 | A1 | 9/2009 | Zhou et al. |
| 2009/0288065 | A1 | 11/2009 | Nathan et al. |
| 2009/0300326 | A1 | 12/2009 | Sweeney |
| 2010/0083092 | A1 | 4/2010 | Schuller et al. |
| 2010/0125828 | A1 | 5/2010 | Vasista |
| 2010/0146254 | A1 | 6/2010 | Park et al. |
| 2010/0312549 | A1 | 12/2010 | Akuwudike |
| 2011/0038531 | A1 | 2/2011 | Arasu et al. |
| 2011/0302553 | A1 | 12/2011 | Gulwani |
| 2012/0011084 | A1 | 1/2012 | Gulwani et al. |
| 2012/0011152 | A1 | 1/2012 | Gulwani et al. |

OTHER PUBLICATIONS

"Final Office Action", U.S. Appl. No. 12/834,031, Jun. 5, 2014, 24 pages.
"Notice of Allowance", U.S. Appl. No. 13/020,153, Mar. 20, 2014, 5 pages.
"Notice of Allowance", U.S. Appl. No. 12/793,700, Jul. 11, 2014, 12 pages.
"Foreign Office Action", CN Application No. 201210023688.6, Jan. 30, 2014, 13 pages.
"Foreign Office Action", CN Application No. 20120023688.6, Sep. 12, 2014, 7 pages.
Richardson, et al., "Approaches to Specification-Based Testing", TAV3 Proceedings of the ACM SIGSOFT '89 third symposium on Software testing, analysis, and verification, Dec. 1989, pp. 86-96.
Sarma, et al., "Synthesizing View Definitions from Data", Proceedings of the 13th International Conference on Database Theory, Mar. 2010, pp. 89-103.
"Non-Final Office Action", U.S. Appl. No. 12/834,031, (May 10, 2012), 16 pages.
Chaudhuri, Swarat et al., "Smooth Interpretation", *Proceedings of the 2010 ACM SIGPLAN conference on Programming language design and implementation*, vol. 45, Issue 06, Jun. 5-10, 2010, retrieved from <http://people.csail.mit.edu/asolar/papers/pldi276-chaudhuri.pdf>,(Jun. 5, 2010), 13 pages.
Cypher, Allen "EAGER: Programming Repetitive Tasks by Example", *Proceedings of the SIGCHI conference on Human factors in computing systems*, Apr. 28-May 2, 1991, retrieved from <http://citeseerx.ist.psu.edu/viewdoc/download;jsessionid=5F31COF2A851 FAE41 EF9FOE1 84F75089?doi=1 0.1.1.35.2047&rep=rep1&type=pdf>,(Apr. 28, 1991), 9 pages.
Elhadi, Mohamed et al., "Use of Text Syntactical Structures in Detection of Document Duplicates", *Third International Conference on Digital Information Management*, Nov. 13-16, 2008, retrieved from <http://ieeexplore.ieee.org/stamp/stamp.jsp?tp=&arnumber=4746719>,(Nov. 13, 2008), pp. 520-525.
Gong, Hongqi et al., "Automating Microsoft Office Word in Visual Basic", *Second International Symposium on Electronic Commerce and Security*, 2009, retrieved from <http://ieeexplore.ieee.org/stamp/stamp.jsp?tp=&arnumber=5209821>,(2009), pp. 93-97.
Gulwani, et al., "Expedited Techniques for Generating String Manipulation Programs", U.S. Appl. No. 13/487,266, filed Jun. 4, 2012, 74 pages.
Kuncak, Viktor et al., "Complete Functional Synthesis", *Proceedings of the 2010 ACM SIGPLAN conference on Programming language design and implementation*, vol. 46, Issue 06, Jun. 5-10, 2010, retrieved from <http://icwww.epfl.ch/-piskac/publications/KuncakETAL10CompleteFunctionaiSynthesis.pdf>,(Jun. 5, 2010), 14 pages.
Lau, Tessa et al., "Learning Repetitive Text-editing Procedures with SMARTedit", *Lieberman, ed., Your Wish is My Command: Giving Users the Power to Instruct their Software, Morgan Kaufmann*, Mar. 21, 2011, retrieved from <http://www.cs.washington.edu/homes/pedrod/papers/ywimc.html> on Mar. 21, 2011, 14 pages.
Solar-Lezama, Armando et al., "Sketching Stencils", *Proceedings of the 2007 ACM SIGPLAN conference on Programming language design and implementation*, vol. 42, Issue 06, Jun. 11-13, 2007, retrieved from <http://www.cs.berkeley.edu/-bodik/research/pldi07-sketching-stencils.pdf>,(Jun. 11, 2007), 12 pages.
Walkenbach, John "Excel 2010 Formulas", *Wiley Publishing, Inc.*, Amazon.com product page only, retrieved from <http://www.amazon.com> on Jul. 1, 2012,(May 24, 2010), 6 pages.
Witten, Ian H., et al., "TELS: Learning Text Editing Tasks from Examples", *MIT Press*, Cambridge, MA, 1993, retrieved from <http://acypher.com/wwid/Chapters/08TELS.html> on Jun. 13, 2012, 17 pages.
Xi, Qian et al., "A Context-free Markup Language for Semi-structured Text", *Proceedings of the 2010 ACM SIGPLAN conference on Programming language design and implementation*, vol. 45, Issue 06, Jun. 5-10, 2010, retrieved from <https://www.cs.princeton.edu/~dpw/papers/anne-pldi10.pdf>,(Jun. 5, 2010), 12 pages.
Zhang, Ying et al., "Editable Replay of IDE-based Repetitive Tasks", *32nd Annual IEEE International Computer Software and Applications Conference*, Jul. 28-Aug. 1, 2008, pp. 473-480, retrieved from <http://sei.pku.edu.cn/-zhangying06/publications/Compsac08-SmartReplayer.pdf>,(Jul. 28, 2008), pp. 473-480.
"Final Office Action", U.S. Appl. No. 12/793,700, (Aug. 22, 2013), 23 pages.
"Non-Final Office Action", U.S. Appl. No. 13/020,153, Nov. 14, 2013, 10 pages.
"European Search Report", European Patent Application No. 11790189.2, Oct. 21, 2013, 2 pages.
"Non-Final Office Action", U.S. Appl. No. 12/834,031, Jan. 3, 2014, 20 pages.
"Non-Final Office Action", U.S. Appl. No. 12/793,700, Jan. 6, 2014, 23 pages.
"Foreign Office Action", European Patent Application No. 11790189.2, Nov. 4, 2013, 6 pages.
Alvarez, et al., "FINDER: A Mediator System for Structured and Semi-Structured Data Integration", In Proceedings of DEXA, Sep. 2002, 5 pages.
Embley, "Table-Processing Paradigms: A Research Survey", International Journal of Document Analysis and Recognition, vol. 8, No. 2-3, May 9, 2006, pp. 66-86.
Gulwani, "Generating Text Manipulation Programs Using Input-Output Examples", U.S. Appl. No. 12/793,700, filed Jun. 4, 2010, 52 Pages.

(56) References Cited

OTHER PUBLICATIONS

Singh, et al., "Learning Semantic String Transformations from Examples," retrieved at <<http://research.microsoft.com/en-us/um/people/sumitg/pubs/semantic.pdf>>, Proceedings of the VLDB Endowment, vol. 5, Issue 8, Apr. 2012, 16 pages.

Gulwani, Sumit, "Automating String Processing in Spreadsheets Using Input-Output Examples," retrieved at <<http://citeseerx.ist.psu.edu/viewdoc/download?doi=10.1.1.174.6699&rep=rep1&type=pdf>>, 38th Annual ACM SIGPLAN-SIGACT Symposium on Principles of Programming Languages, vol. 46, Issue 1, Jan. 26, 2011, 13 pages.

Tejada, et al., "Learning Domain-Independent String Transformation Weights for High Accuracy Object Identification," retrieved at <<http://www.isi.edu/info-agents/papers/tejada02-kdd.pdf>>, Eighth ACM SIGKDD International Conference on Knowledge Discovery and Data Mining, Jul. 23, 2002, 10 pages.

Harris, et al., "Spreadsheet Table Transformations from Examples," retrieved at <<http://research.microsoft.com/en-us/um/people/sumitg/pubs/pldi11-table-synthesis-tr.pdf>>, Proceedings of the 32nd ACM SIGPLAN Conference on Programming Language Design and Implementation, Jun. 4, 2011, 17 pages.

"Inductive Synthesis of Table-based String Transformations," U.S. Appl. No. 13/310,238, filed Dec. 2, 2011, 41 pages.

"Non-Final Office Action", U.S. Appl. No. 12/793,700, (Mar. 14, 2013), 22 pages.

Chattratichat, et al., "A Visual Language for Internet-Based Data Mining and Data Visualization," retrieved at <<http://ieeexplore.ieee.org/stamp/stamp.jsp?tp=&arnumber=795876>>, Proceedings of the IEEE Symposium on Visual Languages, Sep. 1999, 8 pages.

"Planning, Installation, and Problem Determination Guide," retrieved at <<http://callpath.genesyslab.com/docs63/html/cpepipd/epipd142.htm>>, Retrieved on Feb. 24, 2010, Genesys Telecommunications Laboratories, Inc., Daly City, CA, 14 pages.

Matskin, et al., "Value-Added Web Services Composition Using Automatic Program Synthesis," retrieved at <<http://www.cs.cmu.edu/~jinghai/papers/wes02_lncs.pdf>>, Lecture Notes in Computer Science, vol. 2512, Revised Papers from the International Workshop on Web Services, E-Business, and the Semantic Web, May 2002, pp. 213-224.

Schrödl, et al., "Inferring Flow of Control in Program Synthesis by Example," retrieved at <<http://www.tzi.de/~ede/kamp/publications/conf/ki/SchroedlE99.pdf>>, Lecture Notes in Computer Science, vol. 1701, Proceedings of the 23rd Annual German Conference on Artificial Intelligence: Advances in Artificial Intelligence, Sep. 1999, 12 pages.

Gualtieri, Mike, "Deputize End-user Developers to Deliver Business Agility and Reduce Costs," retrieved at <<http://www.forrester.com/rb/Research/deputize_end-user_developers_to_deliver_business_agility/q/id/54191/t/2>>, Forrester Research, abstract provided only, Apr. 15, 2009, 2 pages.

Ko, et al., "Six Learning Barriers in End-User Programming Systems," version retrieved at <<http://faculty.washington.edu/ajko/papers/Ko2004LearningBarriers.pdf>>, Proceedings of the 2004 IEEE Symposium on Visual Languages, Human Centric Computing, 2004, 8 pages.

McFedries, Paul, Tricks of the Microsoft Office 2007 Gurus, Que Corp., 2nd Edition, 2007, Amazon.com product page only, retrieved at <<http://amazon.com>>, retrieved on Jul. 1, 2012, 5 pages.

Myers, et al., "Invited Research Overview: End-User Programming," retrieved at <<http://acm.org>>, Conference on Human Factors in Computing Systems, CHI '06 Extended Abstracts on Human Factors in Computing Systems, 2006, pp. 75-80.

Sumit Gulwani homepage and publication listing, retrieved at <<http://research.microsoft.com/en-us/um/people/sumitg>>, Microsoft Corporation, Redmond, WA, retrieved on Jul. 1, 2012, 5 pages.

Fisher, et al., "From Dirt to Shovels: Fully Automatic Tool Generation from Ad Hoc Data," retrieved at <<http://acm.org>>, Proceedings of the 35th Annual ACM SIGPLAN-SIGACT Symposium on Principles of Programming Languages, 2008, pp. 421-434.

Fisher, et al., "LearnPADS: Automatic Tool Generation from Ad Hoc Data," retrieved at <<http://acm.org>>, Proceedings of the ACM SIGMOD International Conference on Management of Data, 2008, pp. 1299-1302.

Xi, et al., "Ad Hoc Data and the Token Ambiguity Problem," retrieved at <<http://www.cs.princeton.edu/~dpw/papers/pad108.pdf>>, Proceedings of the 11th International Symposium on Practical Aspects of Declarative Languages, 2009, 15 pages.

De Moura, et al., "Z3: An Efficient SMT Solver," retrieved at << http://acm.orgf>>, Proceedings of the Theory and Practice of Software, 14th International Conference on Tools and Algorithms for the Construction and Analysis of Systems, LNCS 4963, 2008, pp. 337-340.

PADs project, online documentation page, retrieved at <<http://www.padsproj.org/doc.html>>, retrieved on Jul. 1, 2012, 3 pages.

Search Report and Written Opinion for PCT Application No. PCT/US2011/037411 (corresponding to U.S. Appl. No. 12/793,700), mailed on Feb. 9, 2012, 8 pages.

Angulin, Dana, "Learning Regular Sets from Queries and Counterexamples," retrieved at <<http://www.cse.iitk.ac.in/users/chitti/thesis/references/learningRegSetsFromQueriesAndCounterExamples.pdf>>, Journal of Information and Computation, vol. 75, Issue 2, 1987, pp. 87-106.

Fisher, et al., "PADS: A Domain-Specific Language for Processing Ad Hoc Data," retrieved at <<http://acm.org>>, Proceedings of the ACM SIGPLAN Conference on Programming Language Design and Implementation, 2005, pp. 295-304.

Fisher, et al., "The Next 700 Data Description Languages," retrieved at <<http://acm.org>>, Conference Record of the 33rd ACM SIGPLAN-SIGACT Symposium on Principles of Programming Languages, 2006, pp. 2-15.

Gulwani, Sumit, "Dimensions in Program Synthesis," retrieved at <<http://acm.org>>, Proceedings of the 12th International ACM SIGPLAN Symposium on Principles and Practice of Declarative Programming, Jul. 2010, pp. 13-24.

Gulwani, et al., "A Polynomial-Time Algorithm for Global Value Numbering," retrieved at <<http://www.cs.berkeley.edu/~necula/Papers/gvndet_sas04.pdf>>, Proceedings of Static Analysis Symposium, 2004, 17 pages.

Jha, et al., "Oracle-Guided Component-Based Program Synthesis," retrieved at <<http://acm.org>>, Proceedings of the 32nd ACM/IEEE International Conference on Software Engineering, vol. 1, May 2010, pp. 215-224.

Lau, Tessa, "Why PBD Systems Fail: Lessons Learned for Usable AI," retrieved at <<http://www.ai.sri.com/~spauldin/usableAI/FinalSubmissions/Lau.pdf>>, CHI 2008 Workshop: Usable Artificial Intelligence, Apr. 2008, 4 pages.

Lau, et al., "Programming by Demonstration using Version Space Algebra," retrieved at <<http://www.cs.washington.edu/homes/pedrod/papers/mlj02.pdf>>, Journal Machine Learning, vol. 53, Issue 1-2, 2003, 60 pages.

Lau, et al., "Programming Shell Scripts by Demonstration," retrieved at <<http://citeseerx.ist.psu.edu/viewdoc/download?doi=10.1.1.74.6224&rep=rep1&type=pdf>>, Workshop on Supervisory Control of Learning and Adaptive Systems, American Association for Artificial Intelligence, Apr. 2004, 5 pages.

Lau, et al., "Version Space Algebra and its Application to Programming by Demonstration," retrieved at <<http://www.cs.washington.edu/homes/pedrod/papers/mlc00c.pdf>>, Proceedings of the Seventeenth International Conference on Machine Learning, 2000, 8 pages.

Lau, et al., "Learning Programs from Traces using Version Space Algebra," retrieved at <<http://www.cs.washington.edu/homes/pedrod/papers/kcap03b.pdf>>, Proceedings of the 2nd International Conference on Knowledge Capture, 2003, 8 pages.

Miller, et al., "Interactive Simultaneous Editing of Multiple Text Regions," retrieved at <<http://citeseerx.ist.psu.edu/viewdoc/download?doi=10.1.1.32.8037&rep=rep1&type=pdf>>, Proceedings of the General Track: 2002 USENIX Annual Technical Conference, 2002, 14 pages.

(56) References Cited

OTHER PUBLICATIONS

Mitchell, Tom M. "Generalization as Search," retrieved at <<http://citeseerx.ist.psu.edu/viewdoc/download?doi=10.1.1.121.5764&rep=rep1&type=pdf>>, Proceedings of Artificial Intelligence, vol. 18, Issue 2, 1982, pp. 203-226.

Nix, R. P., "Editing by Example," retrieved <<http://www.acm.org>>, ACM Transactions on Programming Languages and Systems (TOPLAS), vol. 1, No. 4, Oct. 1985, pp. 600-621.

Russell, et al., Artificial Intelligence: A Modern Approach, 3rd Edition, Prentice Hall, Dec. 2009, Amazon.com product page only, retrieved at <<http://www.amazon.com/Artificial-Intelligence-Modern-Approach-Edition/dp/0136042597>>, retrieved on Jul. 1, 2012, 6 pages.

Srivastava, et al., "From Program Verification to Program Synthesis," retrieved at <<http://acm.org>>, Proceedings of the 37th Annual ACM SIGPLAN-SIGACT Symposium on Principles of Programming Languages, Jan. 2010, pp. 313-326.

Vilar, Juan Miguel, "Query learning of Subsequential Transducers," retrieved at <<http://www.springerlink.com>>, Proceedings of the 3rd International Colloquium on Grammatical Inference: Learning Syntax from Sentences, Lecture Notes in Computer Science, vol. 1147, 1996, pp. 72-83.

Walkenbach, John, "Excel 2010 Formulas," Wiley Publishing, Inc., May 24, 2010, Amazon.com product page only, retrieved at <<http://www.amazon.com>>, retrieved on Jul. 1, 2012, 6 pages.

Witten, et al., "TELS: learning text editing tasks from examples," retrieved at <<http://acypher.com/wwid/Chapters/08TELS.html>>, In Watch what I do: programming by demonstration, pp. 293-307, MIT Press, Cambridge, MA, 1993, 17 pages.

Xi, et al., "A Context-Free Markup Language for Semistructured Text," retrieved at <<http://acm.org>> , Proceedings of the 2010 ACM SIGPLAN Conference on Programming Language Design and Implementation, Jun. 2010, pp. 221-232.

"Program Synthesis" home page, retrieved at <<http://research.microsoft.com/en-us/um/people/sumitg/pubs/synthesis.html>>, retrieved on Jul. 1, 2012, Microsoft Research, Microsoft Corporation, Redmond, WA, 4 pages.

Singh, et al., "Synthesizing Number Transformations from Input-Output Examples," retrieved at <<http://research.microsoft.com/en-us/um/people/sumitg/pubs/cav12-tr.pdf >>, retrieved on Jul. 1, 2012, Microsoft Research, Microsoft Corporation, Redmond, WA, 72 pages.

Singh, et al., "Learning Semantic String Transformations from Examples," retrieved at <<http://acm.org>>, Proceedings of the VLDB Endowment, vol. 5, Issue 8, Apr. 2012, pp. 740-751.

Arasu, et al., "Learning String Transformations From Examples," retrieved at <<http://acm.org>>, Proceedings of the VLDB Endowment, vol., Issue 1, Aug. 2009, pp. 514-525.

Gulwani, et al., "Spreadsheet Data Manipulation Using Examples," retrieved at <<http://research.microsoft.com/en-us/um/people/sumitg/pubs/cacm12-synthesis.pdf>>, retrieved on Jul. 1, 2012, Microsoft Corporation, Redmond, WA, Feb. 2012 (note: 2008 copyright date on p. 1 is incorrect and is therefore crossed out), 9 pages.

"Foreign Notice of Allowance", CN Application No. 201180027421.8, Sep. 21, 2015, 4 Pages.

"Final Office Action", U.S. Appl. No. 12/834,031, Dec. 16, 2015, 21 pages.

"Foreign Office Action", CN Application No. 201180027421.8, Jan. 27, 2015, 13 Pages.

"Foreign Office Action", EP Application No. 11790189.2, Feb. 9, 2015, 3 Pages.

"Foreign Office Action", EP Application No. 11790189.2, Dec. 3, 2014, 3 Pages.

"Non-Final Office Action", U.S. Appl. No. 12/834,031, Jul. 29, 2015, 20 pages.

"Foreign Office Action", EP Application No. 11790189.2, May 29, 2015, 3 Pages.

"Notice of Allowance", U.S. Appl. No. 12/834,061, Nov. 30, 2016, 10 pages.

Di"Data Integration in Mashups", ACM Sigmond Record 38.1, 2009, pp. 59-66.

Romero,"Data Mining in Course Management Systems: Moodle Case Study and Tutorial", Computers & Education 51.1, 2008, pp. 368-384.

Simitsis,"Optimizing ETL Processes in Data Warehouses", 21st International Conference on Data Engineering (ICDE'05) IEEE 2005, 2005, 12 pages.

\* cited by examiner

| INPUT $v_1$ | INPUT $v_2$ | OUTPUT |
|---|---|---|
| Bob | Manager | Bob (Manager) |
| Jim | Secretary | Jim (Secretary) |
| Tammy | ε | ε |
| ε | Assistant | ε |

| INPUT $v_1$ | OUTPUT |
|---|---|
| Corn 10 Z | 10 Z |
| Wheat 3.8 OZ | 3.8 OZ |
| Rye 1 PK | 1 PK |

| INPUT $v_1$ | OUTPUT |
|---|---|
| Great Falls Fire Dept. | GFFD |
| Johnson City Police Dept. | JCPD |
| New York Transit Authority | NYTA |

| INPUT $v_1$ | OUTPUT |
|---|---|
| Bin\Part\index.html | Bin\Part\ |
| Bin\Grade\Specs\specs.doc | Bin\Grade\Specs |

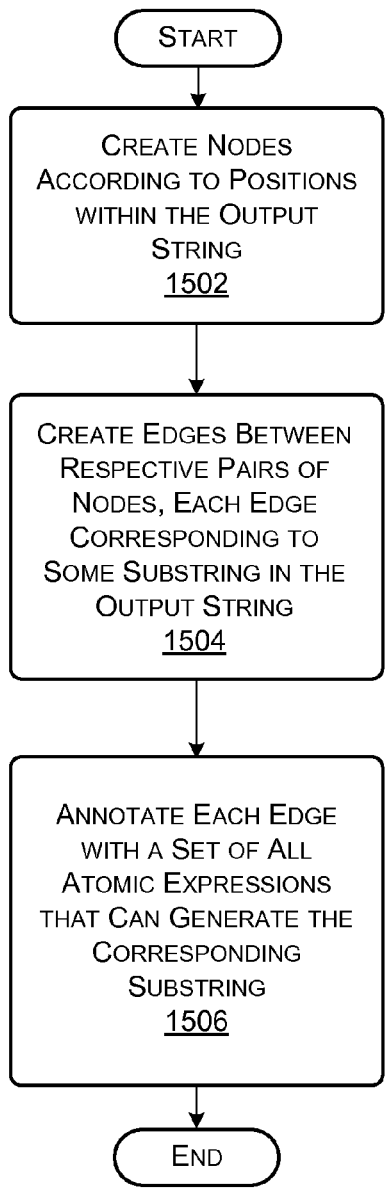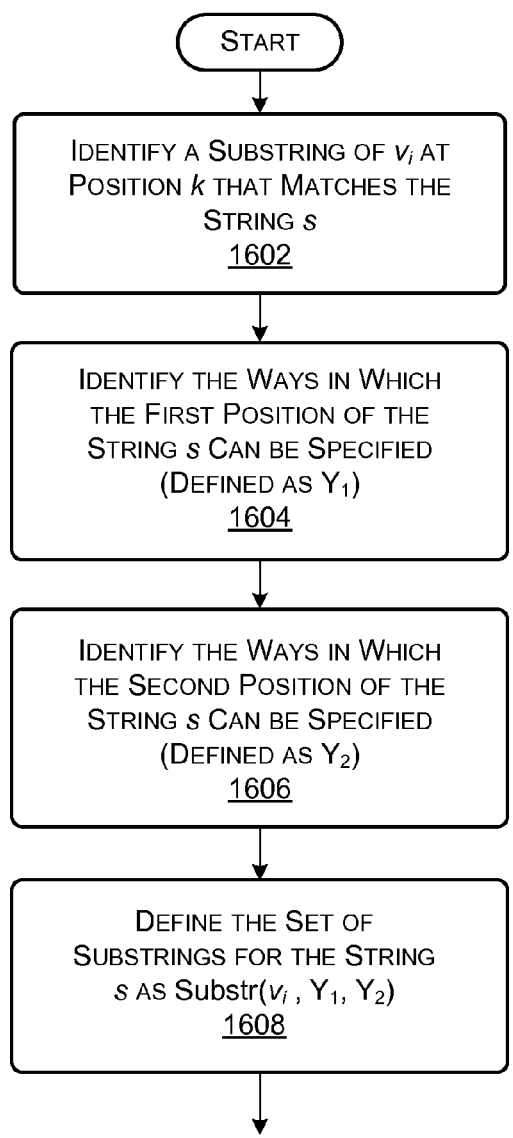
FIG. 15
FIG. 16

EXPEDITED TECHNIQUES FOR GENERATING STRING MANIPULATION PROGRAMS

BACKGROUND

A user of a spreadsheet system may encounter a situation in which is it desirable to transform a large amount of data from one form to another. For example, consider a user who receives a list of customer addresses. The user may wish to transform the addresses into a uniform format. For small data sets, a user may opt to perform this transformation in a manual manner. However, this manual approach is not feasible for larger data sets.

Spreadsheet systems provide various tools to assist the user in performing the type of transformations described above. For example, a spreadsheet system may allow a user to write custom macro programs to perform string transformation tasks. However, this solution is not fully satisfactory. Many end-users have little or no formal experience in creating programs. Hence, a user may be dissuaded from even attempting to create a macro program. If the user does make such an attempt, the user may find the task confusing and burdensome, contributing to overall poor user experience. Further, the user's needs may change over time, requiring manual modification of a macro program.

SUMMARY

A program creation system is described herein which automatically generates string manipulation programs based on analysis of input-output examples. The program creation system operates by generating sets of subprograms for respective input-output examples. The program creation system then groups the sets into partitions by successively performing an intersection operation.

The above-summarized processing typically involves the analysis of a very large number of candidate subprograms. In view thereof, the program creation system applies a set of techniques designed to expedite its processing.

According to one aspect, the program creation system generates the subprograms so as to exclude tokens that are not represented by the input strings provided by the input-output examples. For example, if the input strings of the input-output examples do not use numeric tokens, the program creation system will generate candidate subprograms which omit numeric tokens.

According to another illustrative aspect, the program creation system first generates the subprograms without generating loop-type expressions. If this operation produces unsatisfactory results, the program creation system repeats its processing, this time by generating loop-type expressions. More generally, the program creation system can generate subprograms in a hierarchy of stages, each stage generating subprograms under a program-generating constraint that allows exploration of more complex subprograms, compared to its predecessor stage (if any).

According to another illustrative aspect, the program creation system performs the grouping operation using an expedited graph-intersection operation. Consider a first graph that represents subprograms associated with a first input-output example, and a second graph that represents subprograms associated with a second input-output example. The program creation system intersects the first graph with the second graph by: (1) projecting the first graph onto the second input-output example, yielding a first projection-modified graph; (2) projecting the second graph onto the first input-output example, yielding a second projection-modified graph; and (3) taking the union of the first projection-modified graph and the second projection-modified graph. The Detailed Description clarifies what type of operation the above-referenced "projecting" may entail.

According to another aspect, the program creation system ranks programs (which are created based on the results of the grouping operation) based on the presence of preferred features in the created programs. For example, at least some subprograms in the created programs identify a substring using four regular expressions ($r_1$, $r_2$, $r_3$, $r_4$), of which $r_1$ and $r_2$ describe the left position of the substring, and $r_3$ and $r_4$ describe the right position of the substring. A first preferred feature corresponds to a pattern in which either $r_2$ and $r_3$ are empty, or $r_1$ and $r_4$ are empty. An empty string $\epsilon$ is a wildcard that matches any string. A second preferred feature corresponds to a pattern in which $r_4$ is a counterpart character to $r_1$ (for example, $r_4$ is right bracket and $r_1$ is a counterpart left bracket). A third preferred feature corresponds to a pattern in which $r_1$ and $r_4$ each corresponds to a delimiter character (such as a comma, semi-colon, whitespace, hyphen, etc.).

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 15 is a flowchart that explains one manner in which the subprogram generating module (of FIG. 14) can generate sets of subprograms, represented as respective DAGs.

FIG. 16 is a flowchart that explains one manner in which the subprogram generating module can generate string-type expressions.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a program creation system (PCS) for generating string transformation programs ("created programs"). Section B describes an illustrative expression language that can be used to express the created program. Section C describes functionality for creating sets of subprograms for respective input-output examples. Section D describes functionality for grouping the sets of subprograms into partitions. Section E describes an expedited graph intersection technique. Section F describes functionality for generating selection conditions for use in the created programs. Section G describes functionality for ranking the created programs. And Section H describes illustrative computing functionality that can be used to implement any aspect of the features of the foregoing sections.

This application is related to commonly assigned patent application Ser. No. 12/793,700, filed on Jun. 4, 2010, entitled "Generating Text Manipulation Programs Using Input-Output Examples," and naming the inventor of Sumit Gulwani.

Figure 26:
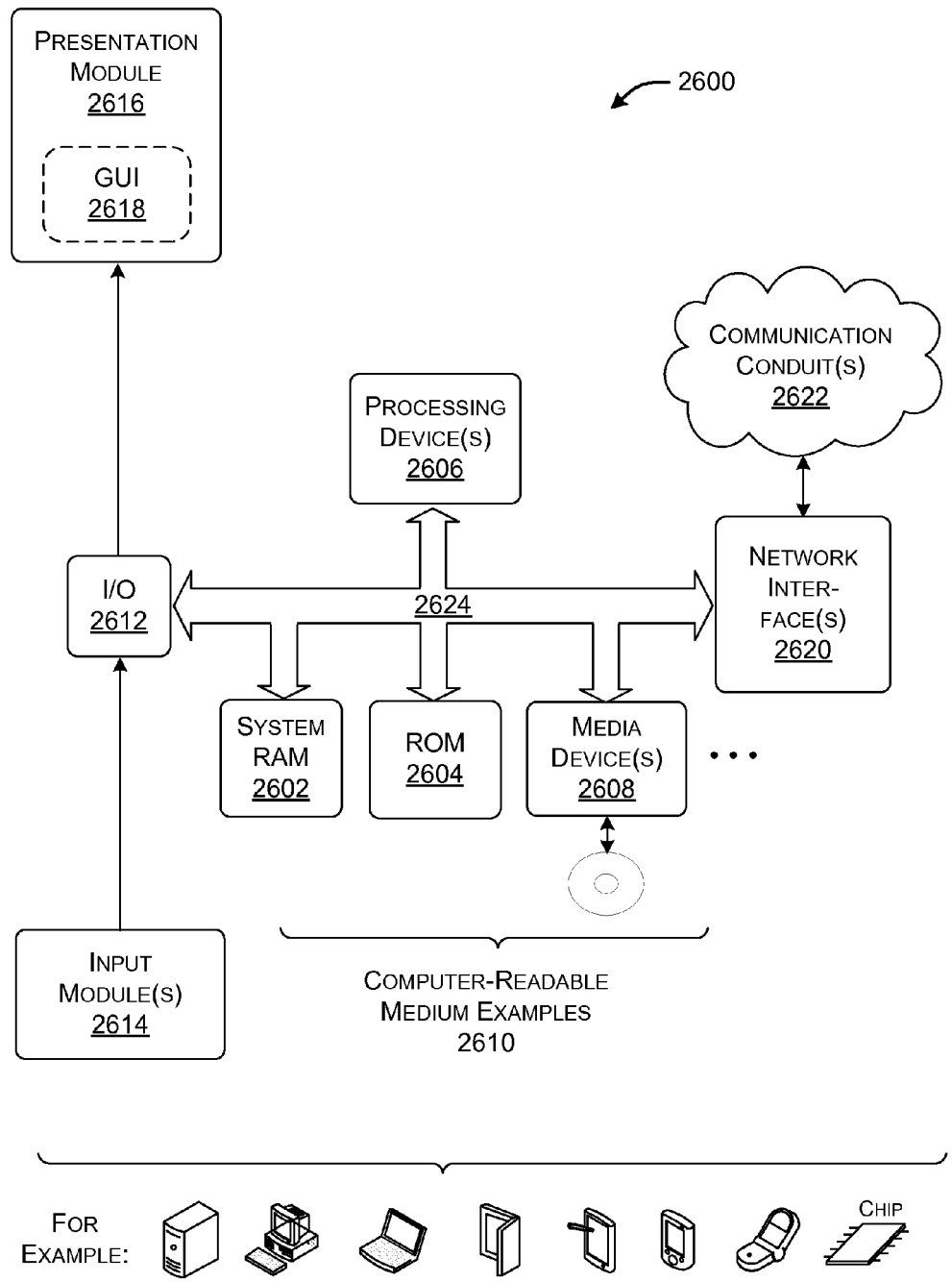
FIG. 26 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 26, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/ or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Overview

Figure 1:
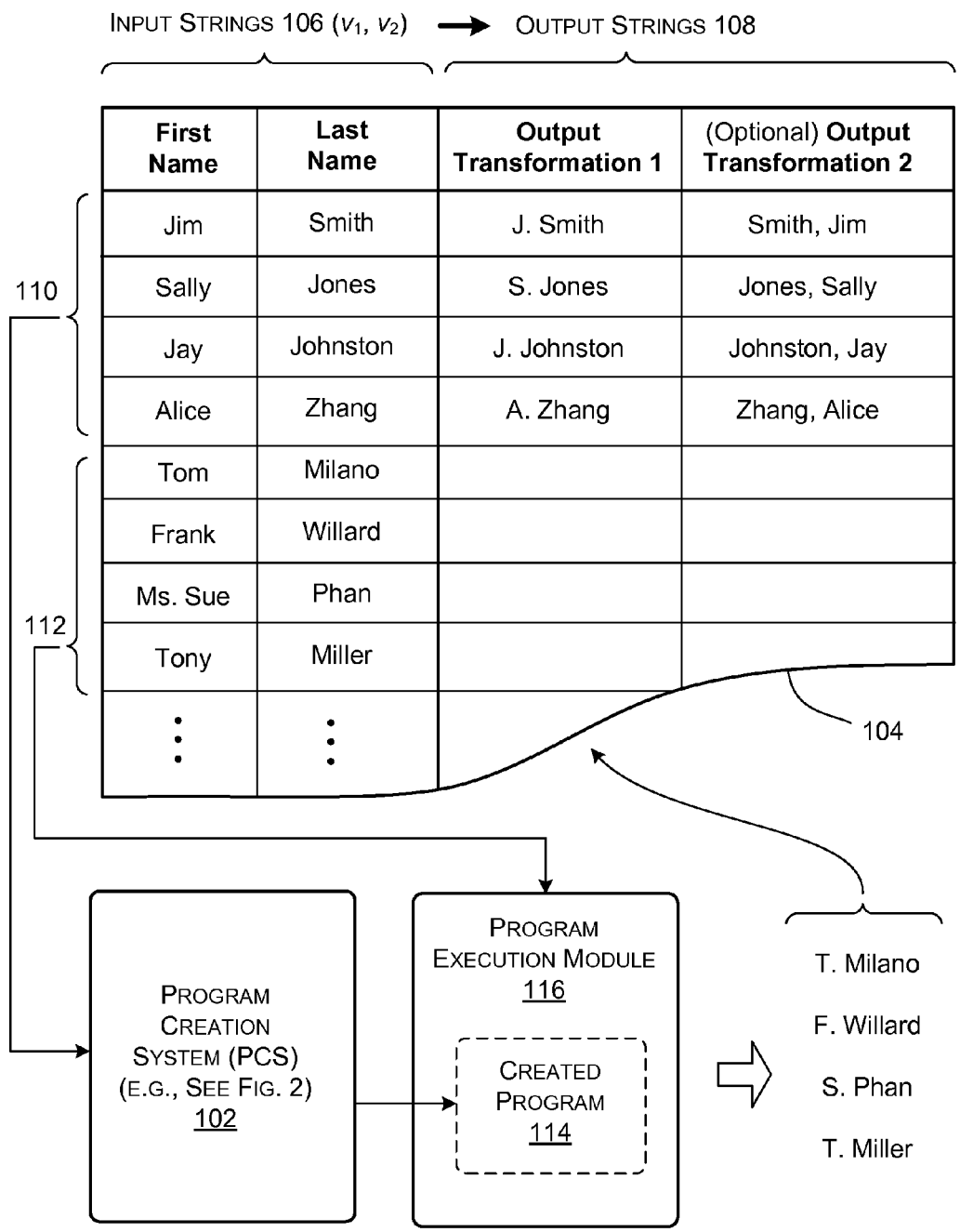
FIG. 1 shows an illustrative program creation system (PCS) for creating at least one program ("created program") based on input-output examples, together with an illustrative program execution module which applies the created program to new input strings.

FIG. 1 shows an illustrative program creation system (PCS) 102 for creating a program (a "created program")

based on input-output examples. Each input-output example includes at least one input string $v_i$ and at least one output string. More specifically, each output string represents some type of transformation performed on one or more input strings.

FIG. 1 also shows an example which clarifies the kind of string transformation operation that may be performed by the PCS 102. The user provides a data set 104 that includes a series of columns. The first two columns provide input strings 106. Namely, a first column provides a list of the first names of customers, corresponding to values of an input variable $v_1$. A second column provides a list of corresponding last names, corresponding to values for an input variable $v_2$.

A third column presents output strings 108. More specifically, the third column represents name information computed from input strings in the first and second columns. The logic that underlies this input-output transformation entails printing the first letter of a first name (that appears in the first column), printing a period (.) and a space, and printing an entire last name (that appears in the second column).

In the particular scenario of FIG. 1, the user (or some other entity) has prepared a set of four input-output examples 110. Namely, a first input-output example maps the input tuple "Jim" and "Smith" into "J. Smith." A second input-output example maps the input tuple "Sally" and "Jones" into "S. Jones," and so on. The data set 104 also includes another set of untransformed input strings 112 that do not yet have corresponding output strings. The user may decline to transform these input strings 112 in a manual manner because the set of input strings 112 may be large; that is, it may be too time-consuming for the user to operate on this set in a manual manner.

The PCS 102 generates a program 114 (a "created program") that assists the user in transforming the set of input strings 112 into a desired output form. From a high level perspective, the PCS 102 generates the program 114 based on the set of input-output examples 110. A program execution module 116 then applies the program 114 to the set of input strings 112. This yields a set of new output strings. For example, the program 114 automatically transforms the input item comprising the tuple "Tom" and "Milano" into "T. Milano." In this case, it appears that the PCS 102 has correctly surmised the intended logic that underlies the transformations in the set of input-output examples 110. That is, the created program 114 appears to be operating by extracting the first letter of the first input string ("T"), adding a period and space after the first letter, and then providing the second input string "Milano" in its entirety.

In the above scenario, the program 114 converts m input strings into a single output string. However, the PCS 102 can generate a second program to map the same input strings (corresponding to the first and last names of customers), or subset thereof, into another output string. For example, FIG. 1 shows that the data set 104 includes an optional fourth column which provides an additional collection of output strings. An output item in the fourth column is formed by selecting the last name in the second column, adding a comma (",") followed by a space, followed by the first name as it appears in the first column. To facilitate explanation, however, many of the examples presented herein will be based on the assumption that the created program 114 transforms a single input string into a single output string.

Figure 2:
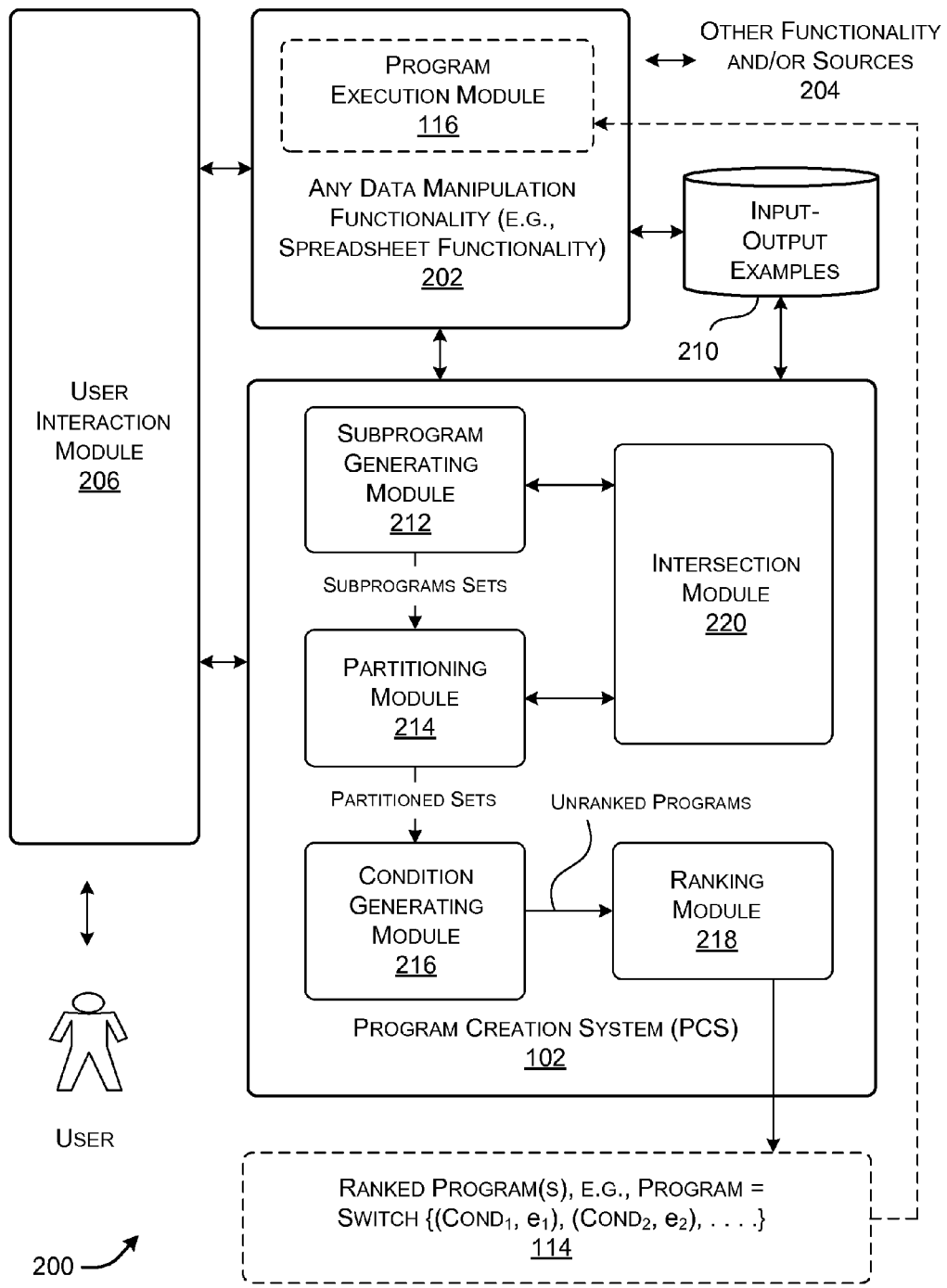
FIG. 2 shows an illustrative data manipulation environment that includes the PCS and program execution module of FIG. 1.

FIG. 2 shows one illustrative data manipulation environment 200 that can make use of the PCS 102 and the program execution module 116 of FIG. 1. From a high-level perspective, the PCS 102 operates in conjunction with any type of data manipulation functionality 202. In one case, for instance, the data manipulation functionality 202 represents a spreadsheet system that allows a user to manipulate data items in tabular form. One spreadsheet system that can be used is Microsoft Office Excel® provided by Microsoft® Corporation of Redmond, Wash. In another case, the data manipulation functionality 202 may represent table manipulation functionality within a document editing application, web application, and so on.

Further, the data manipulation functionality 202 may interact with other functionality 204. For example, the data manipulation functionality 202 may represent a spreadsheet system which interacts with a document editing application. In another example, the data manipulation functionality 202 may represent a spreadsheet system which interacts with a remote resource of any type that is accessible via a network (not shown).

The user may supply a set of input-output examples and untransformed input strings to the data manipulation functionality 202 in any manner, such as by inputting the strings in a manual manner, reading the strings from a file, and so on. The data manipulation functionality 202 may then call on the PCS 102 to provide a created program 114 which automatically maps input strings into output strings, given the set of input-output examples. The program execution module 116 can then use the program 114 to automatically generate output strings for the new input strings.

FIG. 2 illustrates the data manipulation functionality 202 and PCS 102 as two distinct respective modules. This represents one implementation possibility. In another case, the data manipulation functionality 202 may incorporate the PCS 102 as one of its components. Likewise, FIG. 2 shows the program execution module 116 as a component within the data manipulation functionality 202. This represents one implementation possibility. In another case, the data manipulation functionality 202 and the program execution module 116 may represent two distinct modules.

A user interaction module 206 provides an interface by which a user may interact with the data manipulation functionality 202 and the PCS 102. In one case, for instance, the user interaction module 206 may provide a graphical user interface (GUI) that allows a user to interact with the data manipulation functionality 202 and the PCS 102. FIG. 2 depicts the user interaction module 206 as a distinct module with respect to the data manipulation functionality 202 and the PCS 102 to facilitate explanation. This represents one possible implementation. In another case, the data manipulation functionality 202 and/or the PCS 102 may incorporate the user interaction module 206 as a component thereof.

In terms of physical implementation, the various modules and systems shown in FIG. 2 can be implemented by one or more computing devices. These computing devices can be located at a single location or can be distributed over plural locations. Any type(s) of computing device(s) can be used to implement the functions described in FIG. 1, including a personal computing device, a workstation computing device, a laptop computing device, a personal digital assistant device, a mobile telephone device, a game console device, a set-top box device, a server computing device, and so on.

The PCS 102 and the data manipulation functionality 202 can also interact with one or more data stores 210. For example, the data stores 210 can store input-output examples, untransformed new input strings, and so on.

In a first implementation, the above-described functionality (e.g., the PCS 102 and/or the program execution module 116 and/or the data stores 210 and/or the user interaction module 206) may be implemented by a local computing device, with respect to the location of the user who interacts with the local computing device. In a second implementation, the functionality may be provided at a remote location with respect to the user. For example, a data service, comprising a "cloud" of servers and associated storage devices, can host the PCS 102 and/or the data stores 210, etc.; the data stores 210, in turn, may store input-output examples and/or unprocessed input strings and/or generated output strings, etc. In other words, the data service may offer the PCS 102 as a web application. The user may use a local computing device to interact with the web application via a network, such as a local area network, a wide area network (e.g., the Internet), a point-to-point link, and so on. In a third implementation, the above-described functionality can be distributed between local computing functionality and remote computing functionality in any manner.

The PCS 102 itself includes (or can be conceptualized to include) a collection of modules. This section provides an overview of these modules. Later respective sections provide additional details regarding each of these modules.

By way of overview, the PCS 102 can convert the input-output examples into the created program 114 in a four-part process. A subprogram generating module 212 performs the first part; a partitioning module 214 performs the second part; a condition generating module 216 performs the third part; and a ranking module 218 performs the fourth part.

More specifically, the subprogram generating module 212 generates a subset of candidate subprograms for each input-output example. Each candidate subprogram is capable of converting the input string associated with the input-output example into the output string associated with the input-output example. The set of candidate programs, however, use different strategies to perform this conversion. Section C provides additional information regarding the manner in which the subprogram generating module 212 can generate candidate subprograms. Each candidate subprogram is denoted as $e_i$. As will be described in Section B, a candidate subprogram may correspond to a trace expression that, in turn, may concatenate one or more atomic expressions (e.g., substring-type expressions, constant string expressions, loop-type expressions, etc.).

The partitioning module 214 groups compatible input-output examples into partitions. That is, for instance, the partitioning module 214 combines two sets of subprograms together (associated with two respective input-output examples) only if their intersection produces a non-empty set, meaning that the two sets of subprograms are required to have at least one subprogram in common. Each common subprogram for a partition may be regarded as a representative subprogram for that partition, meaning that such a subprogram produces correct results for all of the input-output examples in the partition. Section D provides further details regarding the operation of the partitioning module 214.

The condition generating module 216 generates a selection condition ($cond_i$) for each partition. A selection condition, associated with a particular partition, evaluates to either TRUE or FALSE when applied to a particular input string. If it evaluates to TRUE, then the program execution module 116 applies a representative subprogram that has been selected for the partition. If it evaluates to FALSE, then the representative subprogram is not applied. Instead, the selection condition for some other partition will evaluate to TRUE, and the representative program for that partition will be applied. That is, according to one implementation, the condition generating module 216 generates selection conditions such that, at most, one selection condition evaluates to TRUE for a given input string. Section F provides additional information regarding the operation of the condition generating module 216.

As an outcome of the processing described above, the PCS 102 generates at least one created program 114 based on the representative subprograms ($e_1$, $e_2$, etc.) provided by partitioning module 214 and the corresponding selection conditions ($cond_1$, $cond_2$, etc.) provided by the condition generating module 216. The created program 114 therefore takes the form of a switch operation. If $cond_1$ evaluates to TRUE, then the program execution module 116 applies $e_1$, if $cond_2$ evaluates to TRUE, then the program execution module 116 applies $e_2$, and so on. As can be gleaned from the above explanation, the term "program" or "created program" is being used herein to refer to the encompassing created program that may include one or more subprogram parts (e.g., $e_1$, $e_2$, etc.); the term "subprogram" refers to a part of the created program.

Presume that, in one case, the partitioning module 214 identifies plural representative subprograms for each partition. This means that the PCS 102 may produce plural created programs, each of which is effective in converting any input string to a desired output string (providing, that is, that the new input strings conform to the logic embodied in the input-output examples analyzed thus far). To address this issue, the ranking module 218 can rank the plural created programs based on one or more ranking considerations. Section G provides additional details regarding the illustrative operation of the ranking module 218

Finally, an intersection module 220 forms the intersection of two sets of subprograms, e.g., to determine subprograms that are shared by the two sets. In one case, the intersection module 220 can form the intersection of two sets of subprograms by forming the intersection of two directed acyclic graphs (DAGs) that represent the sets. Section E provides additional information regarding one manner of operation of the intersection module 220.

Figure 3:
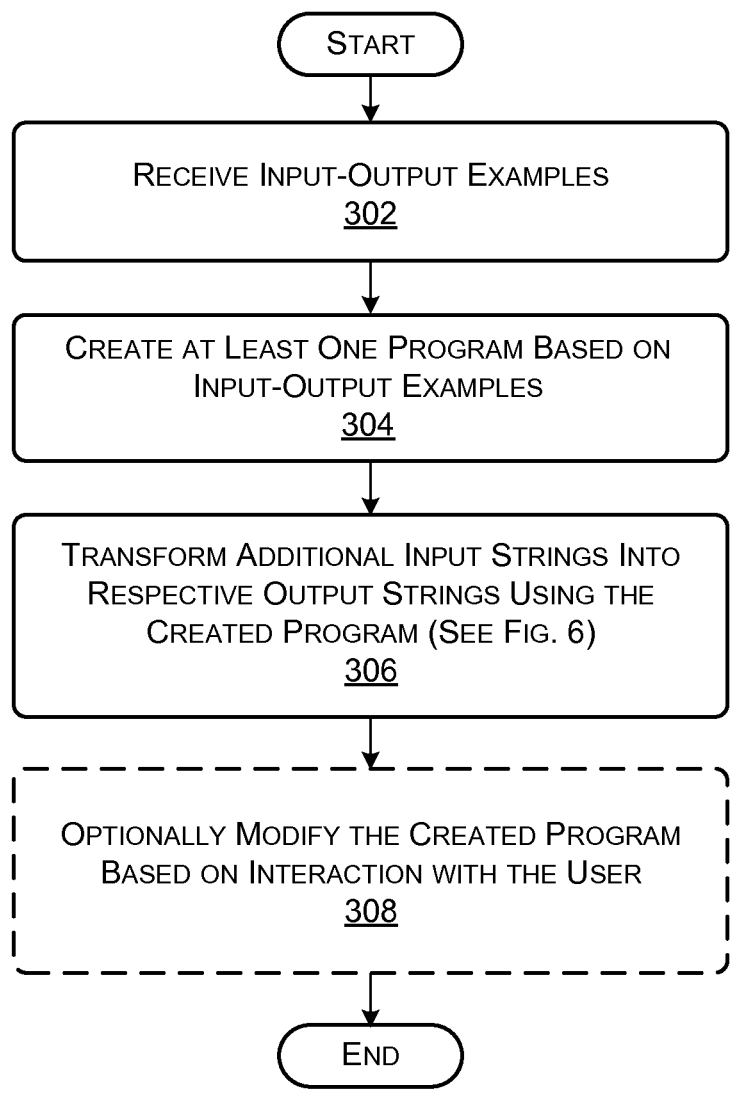
FIG. 3 is a flowchart that shows an overview of one manner of operation of the PCS of FIG. 2.

FIG. 3 shows a procedure 300 which presents a high-level description of the operation of the data manipulation environment 200 of FIG. 1. In block 302, the environment 200 receives a set of input-output examples. Each input-output example includes at least one input string and at least one output string. In block 304, the environment 200 provides at least one created program 114 based on the input-output examples. In block 306, the environment 200 uses the created program 114 to transform additional input strings (which have not yet been transformed) into output strings. In block 308, the environment 200 optionally modifies the created program based on interaction with the user. For example, the PCS 102 may produce an incorrect created program that does not correctly capture the logic underlying an initial set of input-output examples. To address this issue, the user may supply additional input-output examples. The PCS 102 can then repeat its analysis based on the expanded collection of input-output examples.

Figure 4:
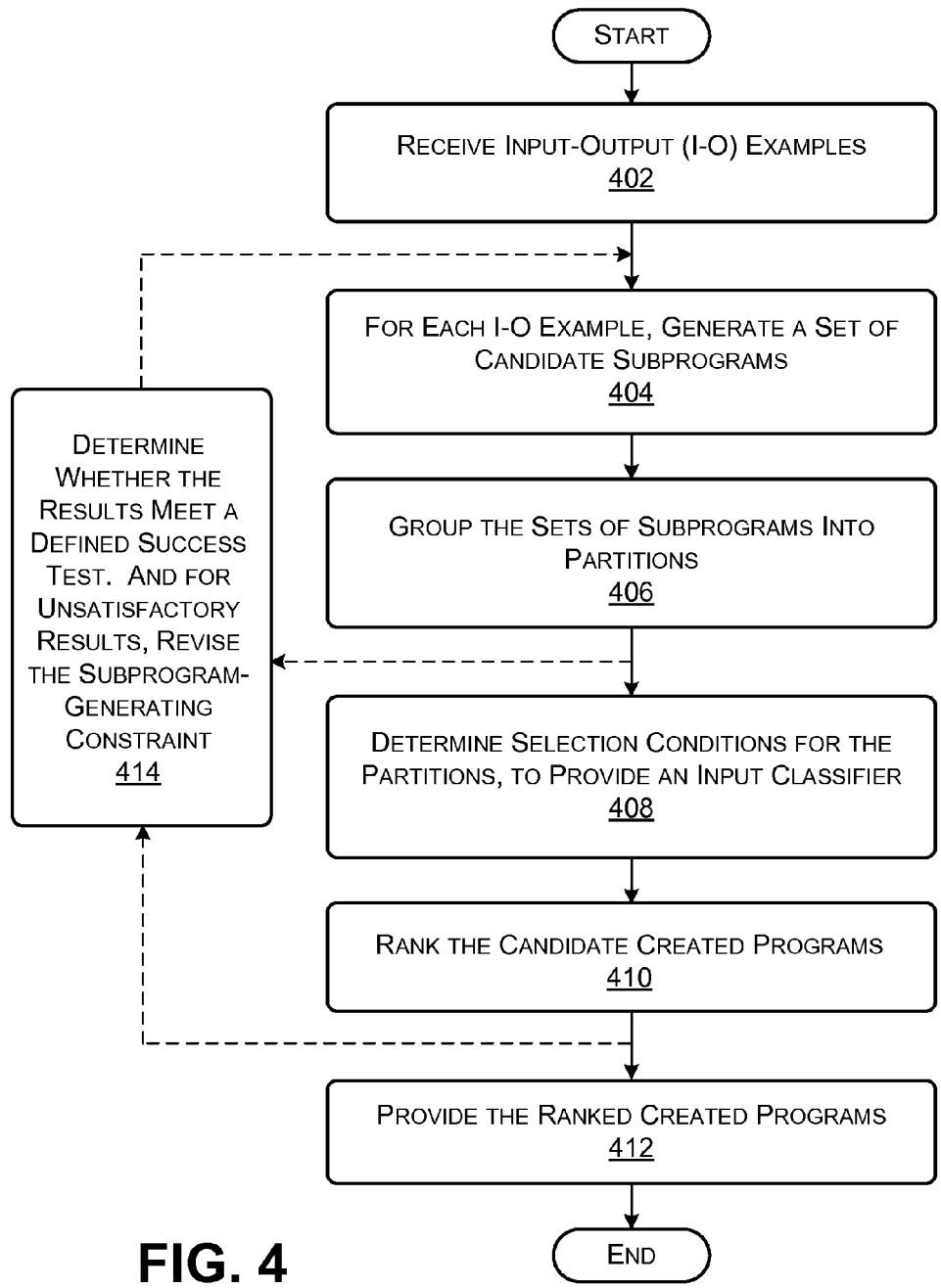
FIG. 4 is a flowchart that explains one manner in which the PCS (of FIG. 2) can produce a created program using a four-part operation. Further, the procedure may include one or more stages.

FIG. 4 shows a procedure 400 which presents a more detailed description of one manner by which the PCS 102 produces the created program 114 (or plural created programs). In block 402, the PCS 102 receives a set of input-output examples. In block 404, the PCS 102 generates a set of candidate programs for each input-output example. Each candidate program is capable of converting an input string associated with its input-output example to an output string associated with its input-output example. In block 406, the PCS 102 groups the sets of subprograms into partitions based on any type of compatibility consideration. In block 408, the PCS 102 determines selection conditions that will selectively invoke representative subprograms associated with respective partitions. The PCS 102 can then construct one or more created programs based on the representative programs (identified in block 406) and the selection conditions (identified in block 408). In block 410, the PCS 102 can rank plural created programs produced by the procedure 400. In block 412, the PCS 102 outputs one or more created programs, as ranked in block 410.

FIG. 4 further indicates that the procedure 400 may occur in a series of two or more stages (as indicated by the feedback loop). Each stage generates created programs based on a specified program-generation constraint. For example, assume that block 404 generates programs in a manner that is governed by a first program-generating constraint. In block 414, the PCS 102 determines whether the subprograms (if any) produced in this process satisfy a predefined success test. If the results are deemed unsatisfactory, the PCS 102 produces a second program-generating constraint, which is more relaxed than the first program-generating constraint. The PCS 102 then repeats block 404 for the second program-generating constraint. On the other hand, if the results for the first stage are satisfactory, the PCS 102 can forgo repeating the program-generating process for the second program-generating constraint.

As a general principle, the second program-generating constraint imposes greater processing complexity compared to the first program-generating constraint. In other words, because the second program-generating constraint is more relaxed compared to the first program-generating constraint, the PCS 102 must consider a larger set of program-generating strategies for the second program-generating constraint compared to the first program-generating constraint. Hence, the PCS 102 can potentially expedite its analysis by first generating created programs under the first program-generating constraint. The PCS 102 can invoke the potentially more time-intensive second stage only if the first stage provides unsatisfactory results. Here, the hierarchical processing is described in the context of two stages. But the PCS 102 can perform any number of iterations of its processing, each stage being governed by a program-generating constraint that is, for example, more relaxed, and hence more time-consuming, compared to the previous constraint.

Consider the following example. In a first stage, the subprogram generating module 212 can generate subprograms which omit loop-type expressions. If this constraint does not produce desired created programs, then, in the second stage, the subprogram generating module 212 can again generate subprograms, this time permitting the use of loop-type expressions. This expedites analysis because it may be possible to generate effective created programs without relying on loop-type expressions, thereby forgoing the potentially costly generation of these types of programs.

In another example, in a first stage, the subprogram generating module 212 can generate subprograms that do not involve the consideration of those substrings that do not align with natural token boundaries within input strings. In a second stage, the subprogram generating module 212 can generate subprograms that do involve consideration of such substrings within input strings. For example, consider an input string "David." In the first stage, the subprogram generating module 212 will not generate subprograms that are predicated on the specification of a substring within this input string, such as "Day". In the second stage, the subprogram generating module 212 relaxes its prior constraint with respect to substrings matching with token boundaries.

Success or failure of a stage can be defined with respect to any environment-specific consideration. In one case, the PCS 102 can determine that a stage is unsuccessful when it fails to generate any valid created program for the input-output examples in question. In another case, the PCS 102 can determine that a stage is unsuccessful when it fails to generate a sufficient number of created programs for considerations, and/or the created programs that it does produce have low ranking scores (e.g., because they are too complex or otherwise undesirable).

In one case, the testing operation (in block 414) may be invoked in response to the output results provided by the partitioning operation in block 406. Alternatively, or in addition, the operations in block 414 may be invoked in response to the output results provided by the ranking operation in block 410. More generally, the testing operation can be triggered at any juncture in the procedure 400 in which failure is evidenced.

Figure 5:
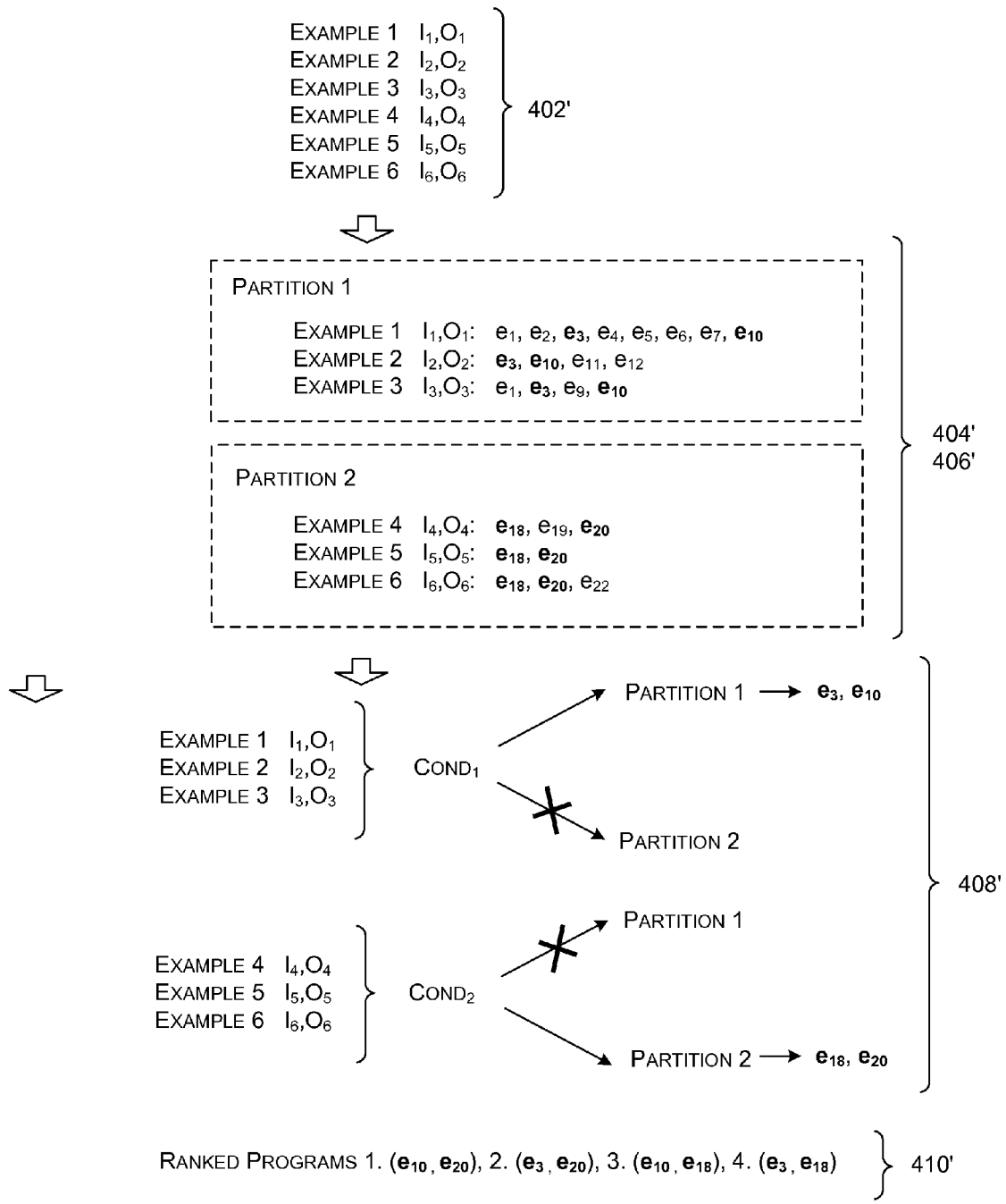
FIG. 5 shows an example which complements the explanation of FIG. 4.

FIG. 5 shows an example of the operation of the procedure 400 of FIG. 4. In block 402', the PCS 102 receives six input-output examples. As stated above, each input-output example i includes at least one input string ($I_i$) and a corresponding output string ($O_i$).

In block 404', the PCS 102 generates a set of subprograms for each input-output example. For example, for input-output example 1, the PCS 102 identifies subprograms $e_1$, $e_2$, $e_3$, $e_4$, $e_6$, $e_7$, and $e_{10}$ as capable of converting the input string $I_1$ into the output string $O_1$. But each of these programs uses a different strategy to perform this transformation.

In block 406', the PCS 102 groups the input-output examples into partitions—in this scenario, two partitions labeled "partition 1" and "partition 2." The partitions are selected, in part, such that the intersection of their respective sets is non-empty. For example, the intersection of input-output examples 1, 2, and 3 yields the common subprograms $e_3$ and $e_{10}$, while the intersection of input-output examples 4, 5, and 6 yields the common subprograms $e_{18}$ and $e_{20}$. Any input string in the first partition can be converted into its corresponding output string using subprograms $e_3$ and $e_{10}$; similarly, any input string in the second partition can be converted into its corresponding output string using subprograms $e_{18}$ and $e_{20}$. For this reason, these common subprograms are referred to herein as representative programs.

In block 408' the PCS 102 chooses a selection condition $cond_1$ to represent the first partition and a selection condition $cond_2$ to represent the second partition. The first selection condition ($cond_1$) is selected such that it evaluates to TRUE for any input item in the first partition and it evaluates to FALSE for any input item in the second partition. The second selection condition ($cond_2$) is selected such that it evaluates to TRUE for any input item in the second partition and it evaluates to FALSE for any input item in the first partition.

In block 410', the PCS 102 ranks the created programs that are produced using the representative programs (provided in block 406') and the selection conditions (provided in block 408'). The PCS 102 performs this task by determining the presence of preferred features within e3, e10, e18, and e20. The PCS 102 then scores each possible program based on its use of preferred features. Assume that the PCS 102 has ranked the created program that uses $e_{10}$ and $e_{20}$ as the most preferable, and the created program that uses $e_3$ and $e_{18}$ as less preferable.

Figures 6, 7:
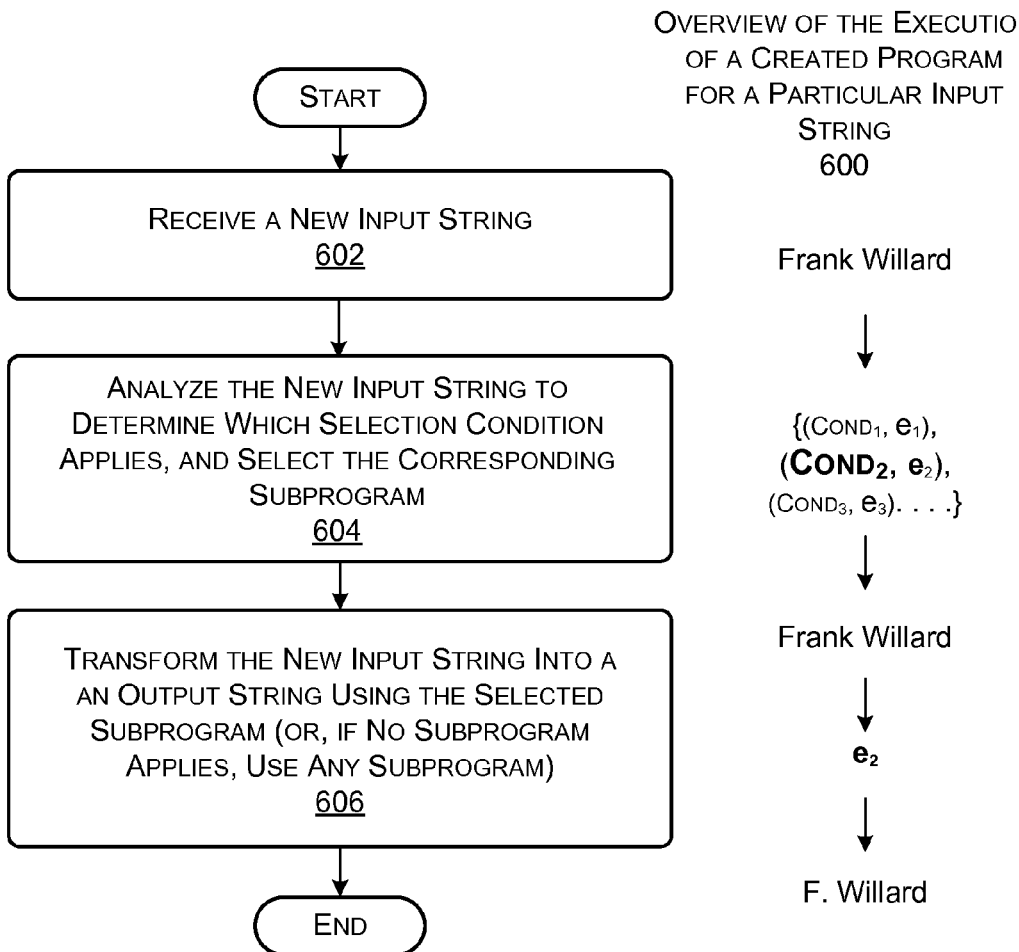
FIG. 6 is a flowchart that explains one manner in which the program execution module (of FIG. 2) can apply the created program (generated by the PCS) to transform a new input string into a new output string.
FIG. 7 shows a collection of input-output examples for use in explaining the operation of the PCS of FIG. 2.

FIG. 6 shows an overview of the manner in which the program execution module 116 uses the created program 114 to operate on a new input string. In block 602, the program execution module 116 receives a new input string, such as the name "Frank Willard" in the example of FIG. 1. In block 604, the program execution module 116 analyzes the input string with respect to the selection conditions in the created program to determine which one applies. Presume that the selection condition $cond_2$ applies, associated with subprogram $e_2$. In block 606, the program execution module 116 uses $e_2$ to transform the input item ("Frank Willard") into an appropriate output item (e.g., "F. Willard").

To provide a more concrete scenario, consider FIG. 7, which shows a collection of input-output examples that are fed into the PCS 102. In this table, $\epsilon$ represents the empty string. The PCS 102 can generate the following created program based on these examples: Switch(($cond_1$, $e_1$), ($cond_2$, $\epsilon$)), where $cond_1$=Match($v_1$, CharTok) $\wedge$ Match($v_2$, CharTok), $e_1$=Concatenate($v_1$, ConstStr("("), $v_2$, ConstStr(")")), and $cond_2$=¬ Match($v_i$, CharTok) $\vee$ ¬ Match($v_2$, CharTok). If $cond_1$ is TRUE (and $cond_2$ is FALSE), then this created program applies the subprogram $e_1$. The subprogram $e_1$ entails printing the first input string $v_1$, printing a left parentheses, printing the second input string $v_2$, and printing a right parentheses. If $cond_2$ is TRUE (and $cond_1$ is FALSE), the created program outputs an empty string $\epsilon$. The $cond_1$ is evaluated by determining whether both the content in $v_1$ and the content in $v_2$ contain a character token (CharTok), as opposed to nothing. The $cond_2$ is evaluated by determining whether either the content in $v_1$ or $v_2$ does not contain a character token. The particular syntax and semantics of the created program will be clarified in the next section.

As a final point, this description sets forth various techniques for expediting the generating of subprograms and programs in the particular illustrative context of the PCS 102 described above. One such technique entails the generation of created programs in stages (as explained with reference to block 414 of FIG. 4). However, the techniques can be applied in other program-generating contexts besides that described above. For example, the techniques can be applied to any implementation that uses a subprogram generating module, with or without the use of a partitioning module and/or a condition generating module.

B. Illustrative Language for Expressing Programs

Figure 8:
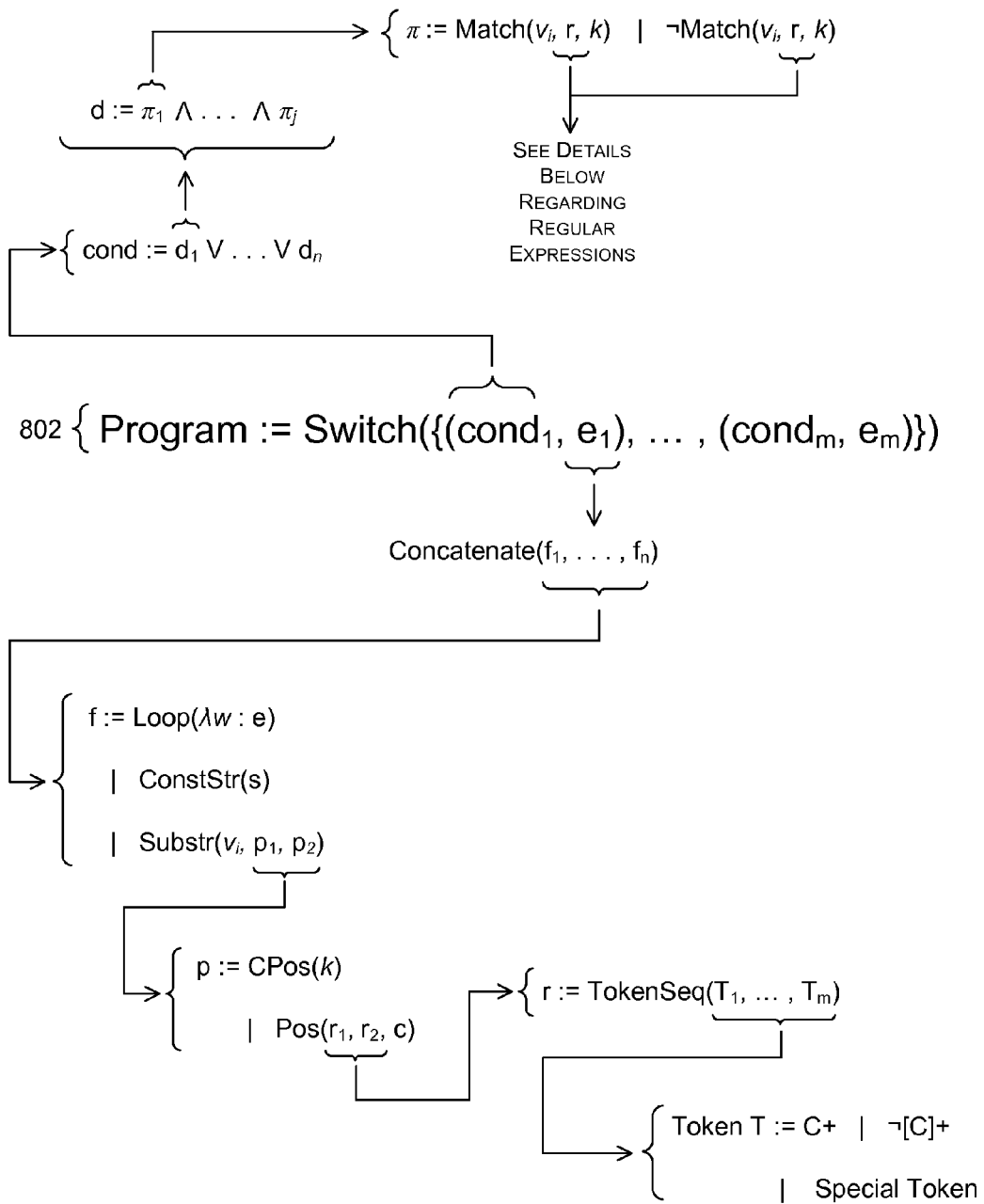
FIG. 8 shows illustrative constructors of an expression language. The PCS can use this expression language to generate its programs.

In one implementation, the subprogram generating module 212 creates subprograms using a custom expression language. FIG. 8 shows illustrative constructors used in that expression language. However, other implementations can use other expression languages having different constructors and structuring paradigms.

The main or "top-level" feature of the expression language shown in FIG. 8 is a Switch constructor 802. The Switch constructor 802 expresses the created program 114 using a disjunctive structure. That is, as already explained, the Switch constructor includes a plurality of selection conditions ($cond_1$, $cond_2$, . . . ) and a plurality of subprograms ($e_1$, $e_2$, . . . ).

Each subprogram can be expressed as a trace expression that concatenates one or more atomic expressions ($f_1$, $f_2$, . . . $f_n$). In one implementation, possible atomic expressions include ContStr, SubStr, and Loop expressions, described below. In general, the notation $s[t_1:t_2]$ denotes a substring of s starting at location $t_1$ and ending at location $t_2$.

More specifically, the ConStr expression has the effect of printing a constant string. For example, in the above example, ConStr("(") has the effect of printing a left parentheses. The SubStr expression, by contrast, has the effect of printing a substring selected from an input string. For example, SubStr($v_i$, $p_1$, $p_2$) involves printing a substring selected from the input string $v_i$, starting at an index specified by $p_1$ and ending at an index specified by $p_2$−1. If either $p_1$ or $p_2$ refer to an index that is outside the range of the input string $v_i$, then the SubStr constructor returns an undefined value (denoted as $\phi$ herein).

Different expressions can be used to specify a position. For instance, the constant position constructor CPos(k) refers to the $k^{th}$ index in a given string from the left side (if k is positive) or the right side (if k is negative). The position constructor Pos($r_1$, $r_2$, c), on the other hand, identifies a position using two regular expressions, $r_1$ and $r_2$, together with an integer expression c that evaluates to a non-zero integer. More specifically, the Pos constructor evaluates to an index t in a given string s such that $r_1$ matches some prefix s[0:t−1] of s, and $r_2$ matches some suffix s[t:l−1] of s, where l refers to the length of s. Furthermore, t is the $c^{th}$ such match starting from the left side (if c is positive) or the right size (if c is negative). If not enough matches exist for a specified c, then $\phi$ is returned.

The Pos constructor can be simplified in certain cases. For example, the constructor SubStr2($v_i$, r, c) denotes the $c^{th}$ occurrence of regular expression r in $v_i$. Further, the notation $v_i$ can be used as a shorthand reference to SubStr($v_i$, CPos (0), CPos(−1)).

A loop-type expression may be denoted by Loop($\lambda$w:e). This expression designates the concatenation of one or more instances of the trace expression e, that is, $e_1$, $e_2$, $e_3$, . . . $e_n$. The trace expression e can include any of the atomic expressions described above. In each particular iteration i of the loop, all occurrences of variable w are replaced by i. n refers to the smallest iteration such that the evaluation of $e_{n+1}$ yields $\phi$.

The top half of FIG. 8 defines the constructors used to specify a selection condition. That is, a selection condition $cond_i$ is formed by OR'ing together one or more conjuncts, e.g., $d_1$ $\vee$ $d_2$, $\vee$ $d_n$. Each conjunct, $d_i$, in turn, is formed by AND'ing together one or more predicates, e.g., $\pi_1$ $\wedge$ $\pi_2$, . . . $\wedge$ $\pi_j$. Each predicate maps an input string to TRUE or FALSE. In one implementation, a predicate may be expressed using the constructor Match($v_i$, r, k). This expression evaluates to TRUE if $v_i$ contains at least k matches of the regular expression r. The simplified constructor Match ($v_i$, r) can be used as a shorthand notation for Match($v_i$, r, 1).

Both the subprograms and selection conditions make use of regular expressions. A regular expression (r=TokenSeq ($T_1$, $T_2$, . . . $T_m$)) corresponds to a sequence of one or more tokens ($T_1$, $T_2$, . . . , $T_m$). $T_1$ can be used as a shorthand reference to a regular expression having only one member, i.e., TokenSeq($T_1$).

Each token, in turn, may correspond to one or more characters selected from a specified class of characters, or one or more "special" characters. For instance, the notation C+ denotes a token that matches a sequence of one or more characters from a character class C. The notation¬C+ denotes a token that matches a sequence of one or more characters that do not belong to character class C. Illustrative classes of characters include (but are not limited to): numeric digits (0-9); alphabetic characters (a-z, A-Z); lowercase alphabetic characters (a-z); uppercase alphabetic characters (A-Z); all alphanumeric characters; all characters, etc. Illustrative "special" tokens include (but are not limited to): a StartTok token which matches the beginning of a string; an EndTok token which matches the end of a string; and various tokens for special characters (such as hyphen, dot, semicolon, colon, comma, backslash, forward slash, left/right parentheses, left/right brackets, etc.)

For better readability, tokens can be referenced by representative names. For example, AlphTok refers to a token defined by one or more alphabetic characters, NumTok refers to a token defined by one or more numeric digits, NonDigitTok refers to a token defined by one or more characters that are not numeric digits, HyphenTok is a token that matches the hyphen character, and so on.

Figures 9, 10, 11, 12:
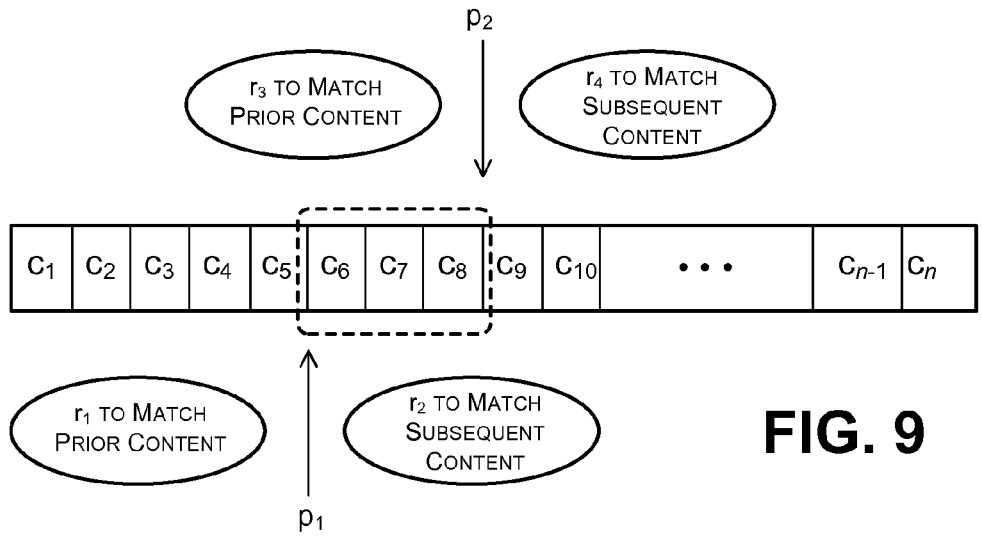
FIG. 9 illustrates one manner in which the PCS can use regular expressions to demarcate a substring.
FIGS. 10-12 show three respective collections of input-output examples for use in explaining one manner in which the PCS defines subprograms using the expression language of FIG. 8.

FIG. 9 clarifies the manner in which the Substr constructor can be used to specify a substring, e.g., corresponding to characters $c_6$-$c_8$ within a larger sequence of characters. Namely, a first Pos expression can use two regular expressions ($r_1$, $r_2$) to designate the starting position $p_1$ of the substring. That is, the Pos expression uses $r_1$ to match content that occurs just prior to $p_1$, and $r_2$ to match content that occurs just after $p_1$. Similarly, another Pos expression specifies an ending position $p_2$ of the string, using $r_3$ to match content that occurs just prior to $p_2$, and $r_2$ to match content that occurs just after $p_2$.

To clarify the meaning and use of the expression language, consider the examples shown in FIGS. 10-12. Each of these figures shows a table which provides a collection of input-output examples. The PCS 102 generates a program in the above-defined expression language which expresses the intended underlying string transformation logic of each collection of input-output examples.

The program Substr($v_1$, Pos($\epsilon$, NumTok, 1), CPos(−1)) can be used to represent the transformation shown in FIG. 10. This program creates an output string by selecting the substring in $v_1$ designated by two positions. A first position (denoted by Pos($\epsilon$, NumTok, 1)) designates an index which is bracketed by the empty string E (designated by $r_1$) and a numeric token in $v_1$ (designated by $r_2$). The constant "1" indicates that this pattern corresponds to the first-encountered such pattern, moving from left to right in $v_1$ (since the constant is positive, not negative). The second position (denoted by (CPos(−1)) designates an index corresponding to the last position in $v_1$. The token $\epsilon$ in this context functions as a wildcard designation that matches any string including the empty string.

The program SubStr($v_1$, CPos(0), Pos(SlashTok, $\epsilon$, −1)) can be used to represent the transformation shown in FIG. 11. This program creates an output string by selecting a substring in $v_1$ that is designated by two positions. A first position (denoted by CPos(0)) designates an index corresponding to the first position in $v_1$. The second position (denoted by Pos(SlashTok, $\epsilon$, −1)) designates an index which is bracketed by the slash token (SlashTok) and the token $\epsilon$. The constant "−1" indicates that this pattern corresponds to the first-encountered such pattern, moving from right to left in $v_1$ (since the constant is negative).

The program Loop($\lambda$w: (Concatenate(Substr2($v_1$, UpperTok, w))) can be used to represent the transformation in FIG. 12. This program repeatedly prints a substring denoted by Substr2($v_1$, UpperTok, w), concatenating such substring with a series of previously printed substrings. That is, on the first iteration (in which w=1) this subprogram finds and prints the first uppercase token (UpperTok) in $v_1$, moving from left to right. In the second iteration (in which w=2) this subprogram finds and prints the second uppercase token in $v_1$, and so on. The Loop program repeats this process until it advances beyond the length of $v_1$, upon which $\phi$ is returned.

Figure 13:
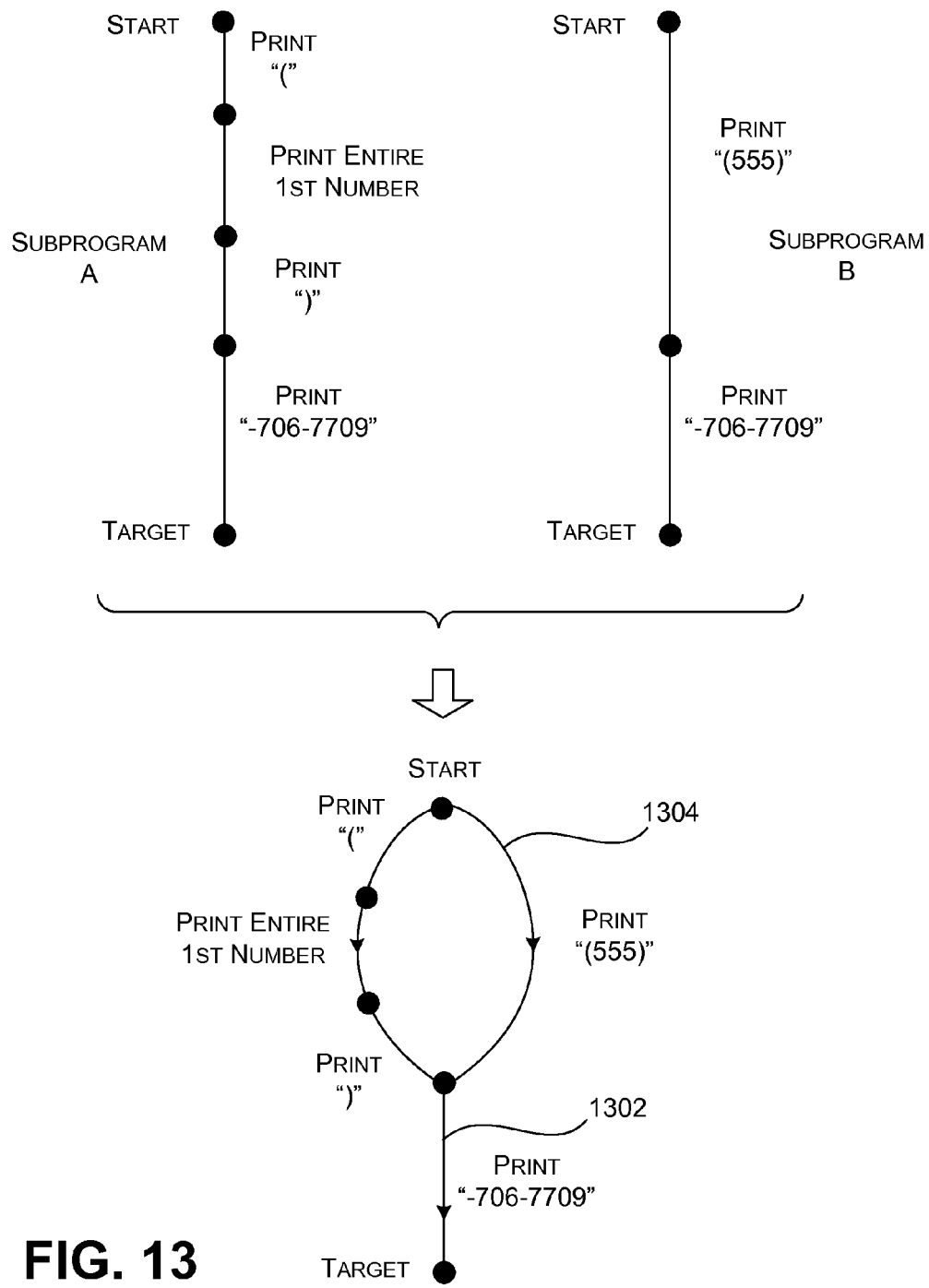
FIG. 13 shows an example of one manner in which the PCS can represent two separate subprograms in the form of a directed acyclic graph (DAG).

Advancing now to FIG. 13, this figure illustrates one manner by which a set of subprograms can be generated in graph form, rather than as individual discrete records. For example, the subprogram generating module 212 can represent each set of subprograms using a directed acyclic graph (DAG). The subprogram generating module 212 may resort to this strategy to succinctly represent a typically large number of subprograms within a set.

More specifically, FIG. 13 shows just two of a great number of possible subprograms used to convert an input string $I_1$: 555-706-7709 to an output string $O_1$: (555)-706-7709". Each subprogram is made up of a series of operations. For example, subprogram A includes the following operations, expressed using informal syntax to facilitate explanation: (1) print the constant string "("; (2) print the first number taken from the input string; (3) print the constant string ")"; and (4) print the constant string "−706-7709". The subprogram B includes the following operations: (1) print the constant string "(555)"; and (2) print the constant string "−706-7709".

FIG. 13 represents each individual subprogram as a collection of nodes connected by edges. That is, the nodes correspond to locations within the output string, which are usually token boundaries. The edges demarcated by the nodes are associated with respective operations performed by the subprograms.

The DAG representation of these two subprograms (shown at the bottom of FIG. 13) merges the nodes and edges of subprogram A with the nodes and edges of subprogram B. This enables the DAG to represent a shared operation as a single edge. For example, the last operation of subprogram A is the same as the last operation of subprogram B; hence, the DAG can allocate a single edge 1302 to this operation.

More generally stated, the subprogram generating module 212 can represent a set of subprograms, corresponding to a single input-output example, as Dag($\tilde{\eta}$, $\eta^s$, $\eta^t$, $\tilde{\gamma}$, W). This notation denotes a DAG including a set of nodes $\tilde{\eta}$ that contains a starting node $\eta^s$ and a target node $\eta^t$. The DAG further includes a set of edges $\tilde{\gamma}$, $\gamma$ representing an individual edge in $\tilde{\gamma}$. W maps the edges in $\tilde{\gamma}$ to respective program operations, corresponding to the above-described atomic expressions. More specifically, each edge connects a first node to a second node, demarcating a substring in the output string. W maps that particular edge to a typically large number of expressions that can be used to express the substring in the above-described expression language. Each path from $\eta^s$ to $\eta^t$ denotes a subprogram.

The PCS 102 can perform its analysis by operating on DAGs, rather than individual subprograms. This applies, for instance, to operations performed by the partitioning module 214, the condition generating module 216, and the intersection module 220.

C. Generating Subprogram Sets

Figure 14:
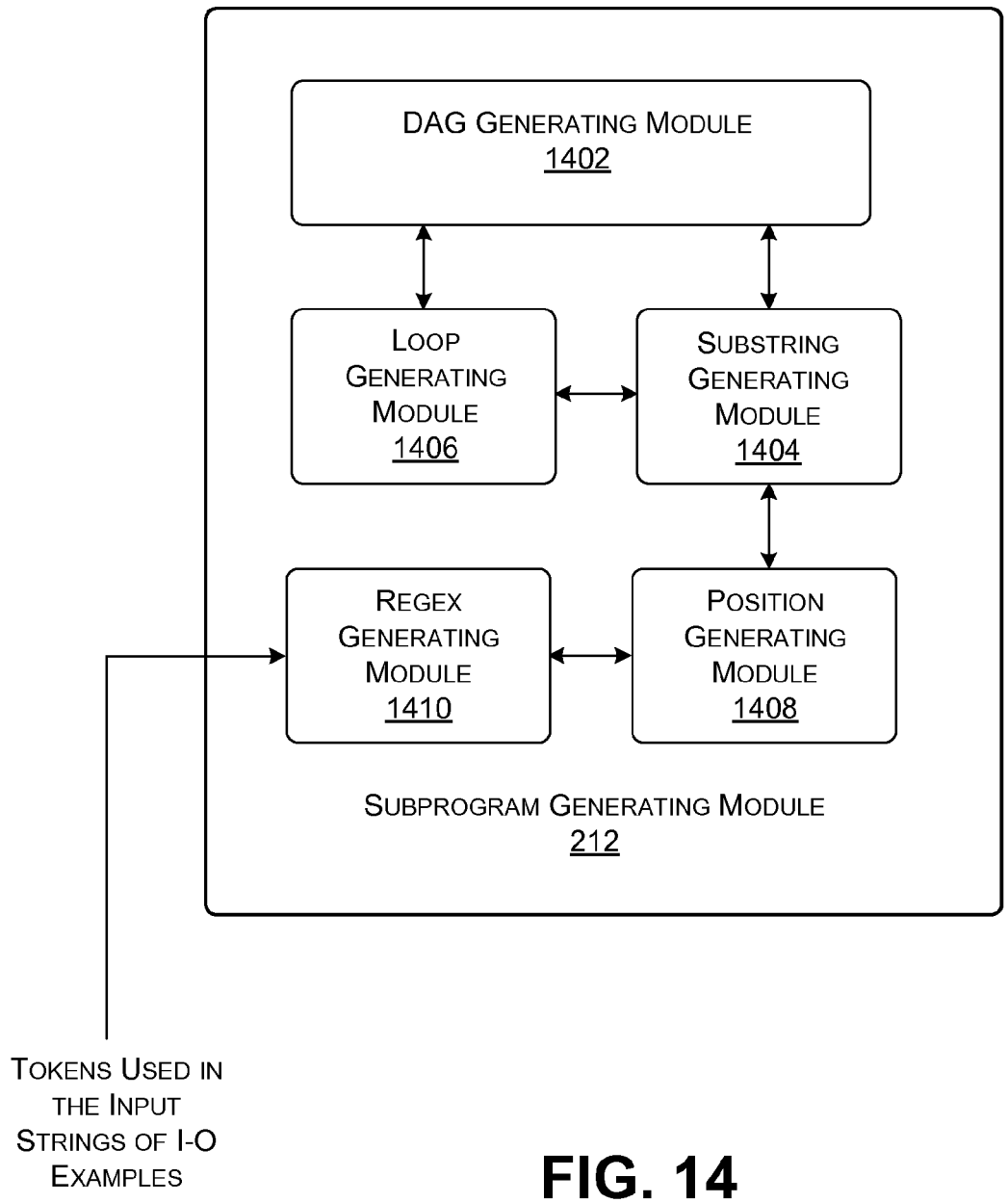
FIG. 14 shows one implementation of a subprogram generating module, which is a component of the PCS of FIG. 2.

FIG. 14 shows one implementation of the subprogram generating module 212 of FIG. 2. The subprogram generating module 212 includes (or can be conceptualized to include) a plurality of sub-modules. For example, a DAG generating module 1402 generates a DAG for each input-output (I-O) example. The DAG represents the set of subprograms that can be used to transform the input string ($I_i$) associated with the input-output example to the output string ($O_i$) associated with the input-output example.

To generate the expressions assigned to the edges in each DAG, the DAG generating module 1402 calls on a substring generating module 1404 and a loop generating module 1406. The substring generating module 1404 generates different possible string-type expressions for each edge in the DAG. Similarly, the loop generating module 1406 generates different possible loop-type expressions for each edge in the DAG. However, as explained in Section A, the subprogram generating module 212 may omit reliance on the loop generating module 1406 in an initial stage of analysis.

The substring generating module 1404, in turn, calls on a position generating module 1408 in the course of generating substring-type expressions. For the Pos expression, the position generating module 1408 generates all the different ways that the first and second positions ($p_1$, $p_2$) of a substring can be specified. And to perform this task, the position generating module 1408 may call on a regex generating module 1410. The regex generating module 1410 defines different token sequences that can be used to pinpoint locations in an input string $v_i$.

FIG. 15 shows a procedure 1500 that represents one manner in which the subprogram generating module 212 can generate a DAG for a particular input-output example. In block 1502, the subprogram generating module 212 creates nodes according to positions within an output string associated with the input-output example. In block 1504, the subprogram generating module 212 creates edges between respective pairs of nodes. Each edge corresponds to some substring in the output string. In block 1506, the subprogram generating module 212 annotates each edge with a set of all atomic expressions that can generate the substring that is associated with the edge, including, potentially, substring-type expressions, constant string expressions, and loop-type expressions.

FIG. 16 shows a procedure 1600 that describes one way in which the substring generating module 1404 can generate substring-type expressions, for example, using the Substr constructor. More specifically, assume that the goal of FIG. 16 is to generate substring-type expressions for a particular string s designated by an edge in a DAG; as explained above, that string s corresponds to part of an output string for an input-output example under consideration. In block 1602, the substring generating module 1404 identifies a substring of $v_i$ (an input string) at position k that matches the string s.

In block 1604, the substring generating module 1404 identifies all the ways that the first position $p_1$ of the string s (in $v_i$) can be expressed, denoted as $Y_1$. In block 1606, the substring generating module 1404 identifies all the ways that the second position $p_2$ of the string s (in $v_i$) can be expressed, denoted as $Y_2$. In block 1608, the substring generating module 1404 defines the set of substring-type expressions that can be used to designate the string s, e.g., as Substr($v_i$, $Y_1$, $Y_2$). Note that block 1604 can be performed independently from block 1606. The procedure 1600 of FIG. 16 is then repeated for other combinations of s, k, and i.

Figure 17:
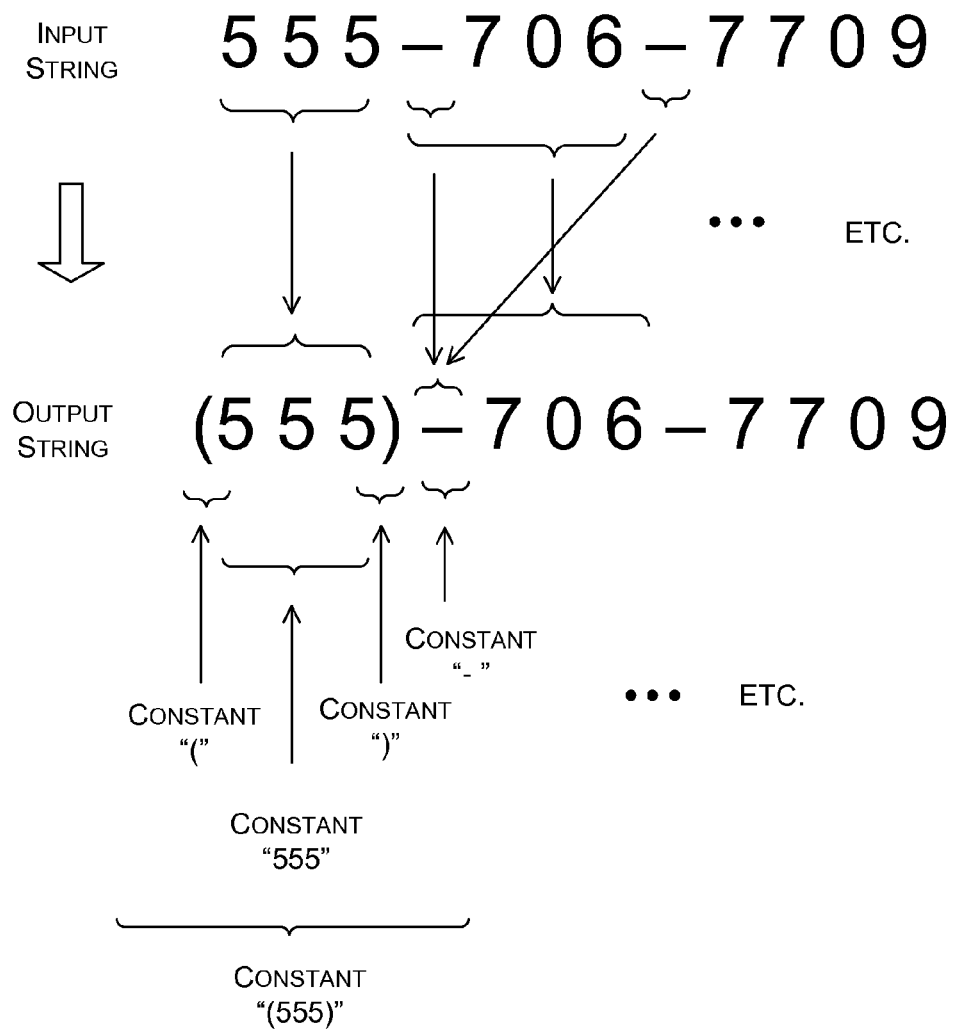
FIG. 17 shows an example that complements the explanation of FIG. 16.

The example of FIG. 17 illustrates the wealth of subprograms that can be used to express an input-output example, in which an input string $I_1$: 555-706-7709 is transformed into an output string $O_1$: (555)-706-7709. In part, a subprogram can generate parts of the output string by finding and extracting matching parts in the input string. In addition, or alternatively, a subprogram can generate parts of the output string by printing constant strings. For example, consider the first dash "-" in the output string. The subprogram generating module 212 considers at least the following three possibilities: (1) the dash is pulled from a matching first dash in the input string; (2) the dash is pulled from a matching second dash in the input string; and (3) the dash is printed as a constant character, and so on.

On top of this complexity, the subprogram generating module 212 enumerates all the different ways that substrings can be specified in the input string, $v_1$. For example, assume the goal is to extract the middle numeric token "706" from $v_1$. Viable expressions include: (1) SubStr2($v_1$, NumTok, 2); (2) SubStr2($v_1$, AlphNumTok, -2); (3) SubStr($v_1$, Pos(Hy-phenTok, $\epsilon$, 1), Pos($\epsilon$, HyphenTok, -1), and so on. As can now be readily appreciated, the subprogram generating module 212 is capable of generating a huge number of subprograms for each input-output example. It is even possible to express a matching token in $v_1$ in negative terms, e.g., by specifying any token that is not a numeric token, or any token that is not an uppercase token, and so on.

Figure 18:
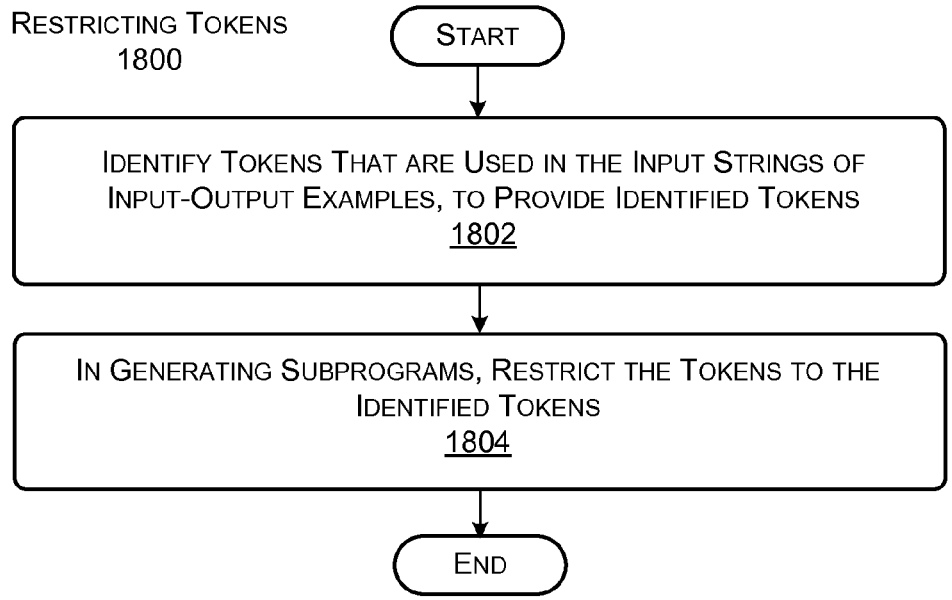
FIG. 18 is a flowchart that explains one manner in which the subprogram generating module can constrain its choice of tokens in generating subprograms.

FIG. 18 shows a procedure 1800 which illustrates one way of reducing the complexity of the operation of the subprogram generating module 212. In block 1802, the subprogram generating module 212 identifies tokens that are used in the input strings of the input-output examples, to provide identified tokens. For example, consider the set of input-output examples 110 shown in FIG. 1. The input strings in these examples include only alphabetic characters, including upper case characters and lowercase characters. These strings do not use numeric characters or any "special" tokens, such as dashes, parentheses, brackets, slashes, etc.

In block 1804, the subprogram generating module 212 generates the subprograms by excluding consideration of tokens that are not represented in the identified set of tokens. This principally affects the operation of the regex generating module 1410 shown in FIG. 14. That is, in generating regular expressions (for use in generating the Pos expression, for example), the regex generating module 1410 is restricted to "pull from" only the kinds of tokens that are expressed in the input strings of the input-output examples. The predicates in a selection condition are also specified using regular expressions. There too, the regular expressions are permitted to use only the identified set of tokens.

In another implementation, the subprogram generating module 212 can also identify the tokens used in other input strings, independent of the input-output examples. For example, in the case of FIG. 1, the subprogram generating module 212 can also identify the tokens that are used in the untransformed input strings 112. This yields an expanded set of identified tokens, e.g., including the tokens found in the input strings of the input-output examples 110 and in the untransformed input strings 112. Then, in block 1804, the subprogram generating module 212 can generate subprograms by excluding consideration of tokens that are not found in the expanded set of identified tokens. More generally stated, the subprogram generating module 212 can form the set of identified tokens by drawing from any supplemental sources of evidence that are deemed relevant to a collection of input-output examples.

Figure 19:
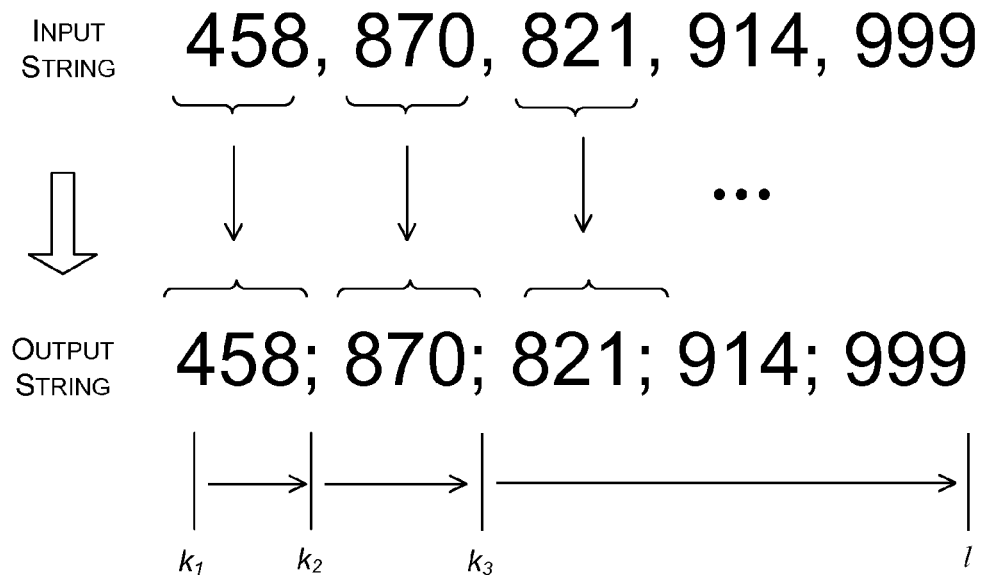
FIG. 19 shows an illustrative input-output example that includes repetitive content. The subprogram generating module can formulate a loop-type expression to express this repetitive content.

Advancing to FIG. 19, this figure shows an input-output example that exhibits repetitive content. For instance, the output string provides a series of numeric tokens interspersed by semicolons. Hence, this output string is a good candidate to represent using a Loop expression, as described above.

Figure 20:
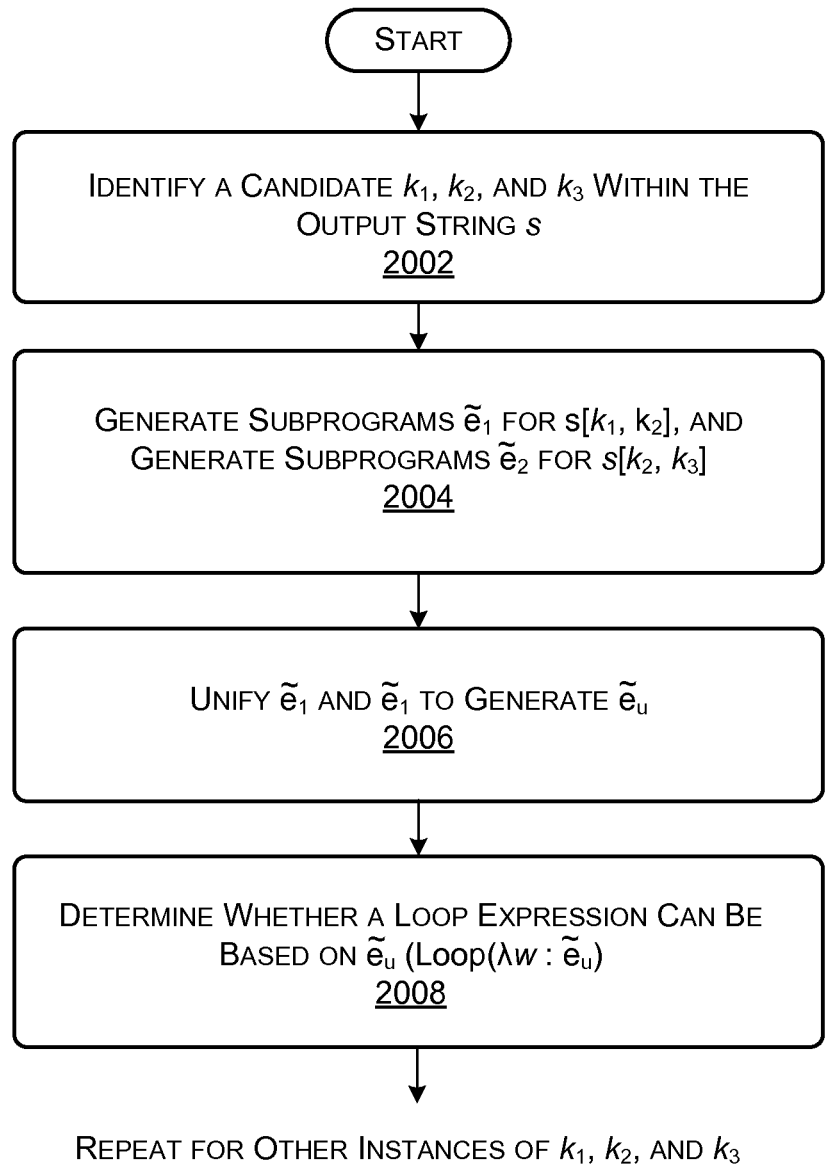
FIG. 20 is a flowchart that that explains one way in which the subprogram generating module can generate a loop-type expression.

FIG. 20 describes a procedure 2000 that represents one way in which the loop generating module 1406 (of FIG. 14) can generate a loop expression. In block 2002, the loop generating module 1406 considers three candidate positions ($k_1$, $k_2$, $k_3$) within an output string s under consideration. In block 2004, the loop generating module 1406 generates a set of programs $\tilde{e}_1$ that can be used to express the substring of s demarcated by $k_1$ and $k_2$, that is, s[$k_1$:$k_2$]. Similarly, the loop generating module 1406 generates a set of programs $\tilde{e}_2$ that can be used to express the substring of s demarcated by $k_2$ and $k_3$, that is s[$k_2$: $k_3$]. In block 2006, the loop generating module 1406 relies on the intersection module 220 to unify $\tilde{e}_1$ and $\tilde{e}_2$, which yields the set $\tilde{e}_u$. In effect, $\tilde{e}_u$ will provide an indication of any commonality in $\tilde{e}_1$ and $\tilde{e}_2$; any commonality, in turn, suggests that $s[k_2:k_3]$ can be considered a repetition of $s[k_1:k_2]$ Then, in block 2008, the loop generating module 1406 determines whether a loop expression be formulated based on $\tilde{e}_u$, namely (loop($\lambda$w:$\tilde{e}_u$)). In one implementation, the loop generating module 1406 executes $\tilde{e}_u$ one or more additional times, to produce a resultant concatenated string (e.g., formed by executing $\tilde{e}_u$ three or more times for w=1, 2, 3, etc.). If the resultant string produced thereby agrees with the output string s, then the loop generating module 1406 determines that Loop($\lambda$w:$\tilde{e}_u$) is a valid expression for inclusion in a subprogram.

The loop generating module 1406 repeats the above-described analysis for different combinations of $k_1$, $k_2$, and $k_3$. Eventually, the loop generating module 1406 will match up $k_1$, $k_2$, and $k_3$ to the parts of the output string that are truly repetitive, if, in fact, the output string contains repetitive content.

D. Generating Partitions

Figure 21:
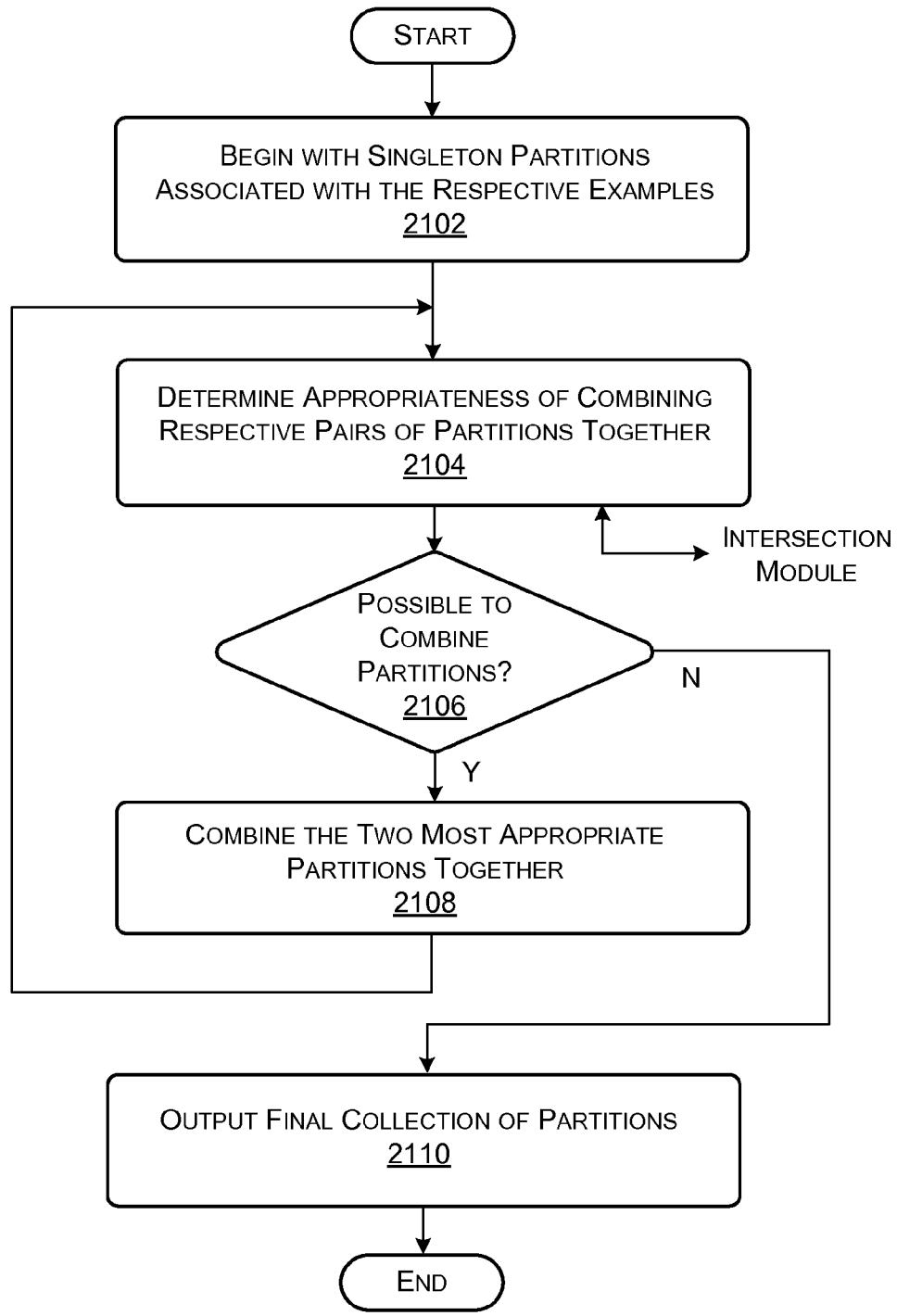
FIG. 21 is a flowchart which shows one illustrative manner in which the PCS can group collections of input-output examples by successively performing an intersection operation.

FIG. 21 shows a procedure 2100 that explains one manner of operation of the partitioning module 214 of FIG. 2. To repeat, the partitioning module 214 groups together sets of input-output examples into partitions. At this stage, the subprogram generating module 212 has generated a set of subprograms for each input-output example. In block 2102, the partitioning module 214 starts its analysis by considering all of the input-output examples as separate singleton partitions.

In block 2104, the partitioning module 214 determines the appropriateness of combining respective pairs of partitions together. The partitioning module 214 can make this determination based on multiple compatibility factors. A first compatibility factor pertains to whether the intersection of two candidate partitions produces a non-empty set, meaning that there is at least one common subprogram that is shared by the two candidate partitions. If this factor is not satisfied, then the partitioning module 214 can identify the two candidate partitions as non-combinable.

A second compatibility factor pertains to the relation of the two candidate partitions with respect to other partitions. For example, assume that the partitioning module 214 is currently considering the appropriateness of combining a partition associated with an input-output example A ("partition A") with a partition associated with an input-output example B ("partition B"). As stated, a first requirement is that the intersection of partition A and partition B is non-empty. In addition, the partition module 214 determines whether the intersection of partition A with a partition C has the same characteristics as the intersection of partition B with the partition C. The partitioning module 214 repeats this analysis for all other partitions, e.g., partition D, partition E, etc.

More specifically, the partitioning module 214 can compute a compatibility score based on the extent to which the A and B candidate partitions share characteristics with respect to all other partitions (besides A and B). For example, a positive point is earned if both partition A and partition B form non-empty intersections with partition C. Another positive point is earned if both partition A and partition B form empty intersections with partition C, and so on. No positive point is earned when none of the above-described conditions is met. In this manner, the partitioning module 214 takes into account the global implications of combining any two partitions together.

A third compatibility factor pertains to the size of a resultant partition produced by combining two partitions together. In one implementation, the partitioning module 214 invokes the size compatibility factor when there are two or more pairs of partition-combinations that have similar scores with respect to the above-described second compatibility factor. For example, if the candidate partition A+B has a similar shared-characteristic score compared to the candidate partition D+E, then the partitioning module 214 can select whatever candidate partition has the largest size.

The partitioning module 214 performs the above-described type of analysis so as to combine partitions that will likely serve as the nucleus for further constructive partitioning (in future iterations). For example, if partition A and partition B form non-empty sets with many other partitions, then it will likely be possible to successively "grow" the A+B partition by adding additional partitions to it. Overall, the partitioning module 214 attempts to produce a small number of partitions. The above algorithm achieves this goal by applying a strategically "greedy" approach to combining partitions.

The partitioning module 214 can interact with the intersection module 220 to perform the operations of block 2104. That is, the intersection module 220 can determine whether two partitions are non-empty by forming the intersection of two directed acyclic graphs associated with the partitions.

In block 2106, the partitioning module 214 determines whether it is possible to combine any two partitions. If not, the procedure 2100 terminates and outputs a final collection of partitions (in block 2110).

Alternatively, assume that block 2106 is answered in the affirmative, indicating that there are at least two partitions that can be combined together. If so, in block 2108, the partitioning module 214 selects an appropriate pair of partitions to combine based on a consideration of the above-described three compatibility factors. The partitioning module 214 then combines the selected pair of partitions together.

Upon combining two partitions together, the combined partitions are treated as a single partition for analysis in a next iteration of analysis provided by the procedure 2100.

E. Intersecting Two DAGs

Figure 22:
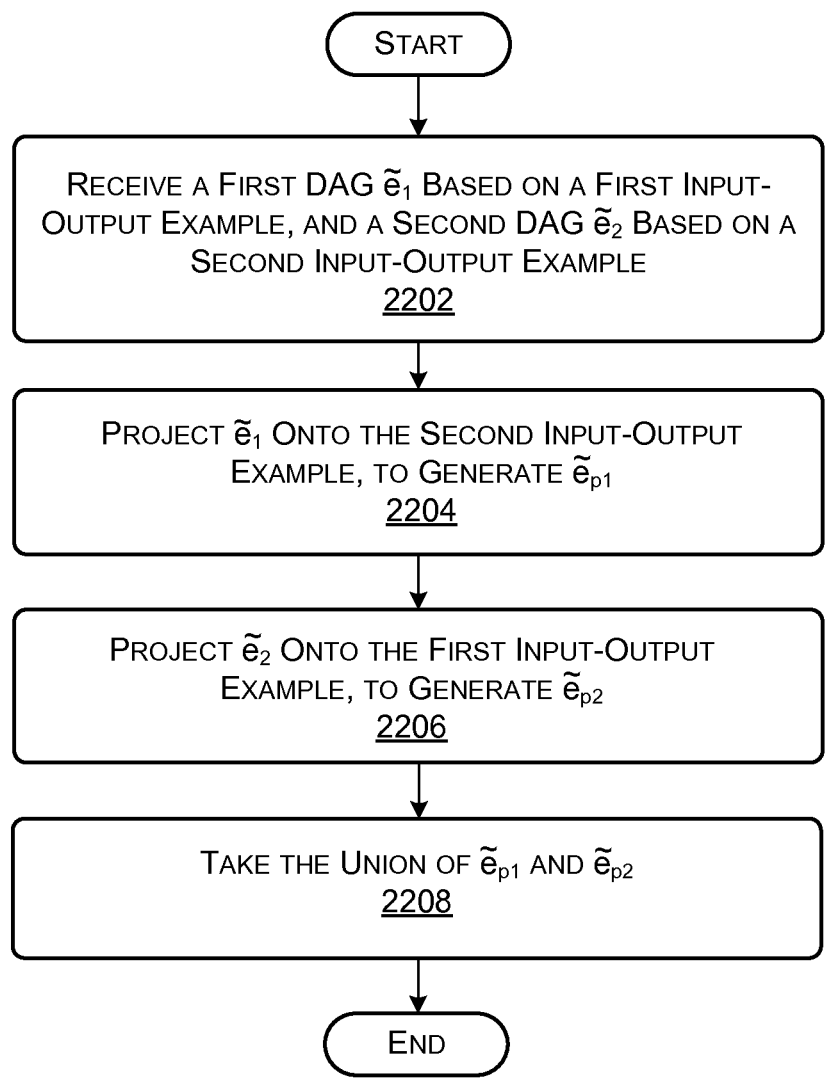
FIG. 22 is a flowchart which shows one illustrative way in which the PCS can perform an expedited intersection operation of two DAGs.

In one approach, the intersection module 220 can perform the intersection of two DAGs in a manner that is similar to the intersection of two regular automatas. FIG. 22, by contrast, describes a procedure 2200 that applies a different way of intersecting DAGs. This approach is more efficient than the intersection of two regular automatas, and therefore is another technique which expedites the processing performed by the PCS 102. For example, the complexity of the approach described in FIG. 22 increases linearly with the size of the DAG produced by the intersection operation, rather than being quadratic in the size of the input DAG (as in the case of the intersection of two regular automatas).

In block 2202, the intersection module 220 receives a first DAG $\tilde{e}_1$ and a second DAG $\tilde{e}_2$. The subprogram generating module 212 generates these DAGs in the manner described in Section C. The first DAG $\tilde{e}_1$ represents the subprograms associated with a first input-output example, while the second DAG $\tilde{e}_2$ represents the subprograms associated with a second input-output example. The first input-output example maps at least a first input string $I_1$ to a first output string $O_1$; similarly, the second input-output example maps at least a second string item $I_2$ to a second output string $O_2$.

In block 2204, the intersection module 220 projects $\tilde{e}_1$ onto the second input-output example. In a projection operation, the subprograms in $\tilde{e}_1$ are used to transform $I_2$ of the second input-output example, to produce a transformation result. The intersection module 220 then compares the transformation result with the $O_2$ of the second input-output example. If the transformation result is inconsistent with $O_2$, the intersection module 220 then deletes the expression(s) in $\tilde{e}_1$ which are responsible for the inconsistency. This may entail deleting an edge from $\tilde{e}_1$, insofar as that edge is associated with the expression(s) that has produced the inconsistent result.

Consider, for example, the DAG shown on the bottom of FIG. 13. Assume that the intersection module 220 projects this DAG onto an input-output example that specifies an input string of $I_x$: 333-706-7709 and an output string of $O_x$: (333)-706-7789. Running the DAG in FIG. 13 on $I_x$ will therefore produce a transformation result that is incorrect (in part) due to the edge 1304 that is associated with the instruction Print "(555)". Hence, the intersection module 220 can prune the edge 1304 from the DAG.

In block 2206, the intersection module 220 projects $\tilde{e}_2$ onto the first input-output example. This operation is performed in the manner described above, e.g., by running the subprograms in DAG $\tilde{e}_2$ with respect to the input string $I_1$. Assume that block 2204 produces a first projection-modified DAG $\tilde{e}_{p1}$, and that block 2206 produces a second projection-modified DAG $\tilde{e}_{p2}$.

In block 2208, the intersection module 220 forms the union of $\tilde{e}_{p1}$ and $\tilde{e}_{p2}$. This final result constitutes the intersection of $\tilde{e}_1$ and $\tilde{e}_2$. A union operation involves combining the edges in $\tilde{e}_1$ with the edges in $\tilde{e}_2$. In other words, this combination operation is similar to the combination of subprogram A and subprogram B shown in FIG. 13.

F. Generating Selection Conditions

Figure 23:
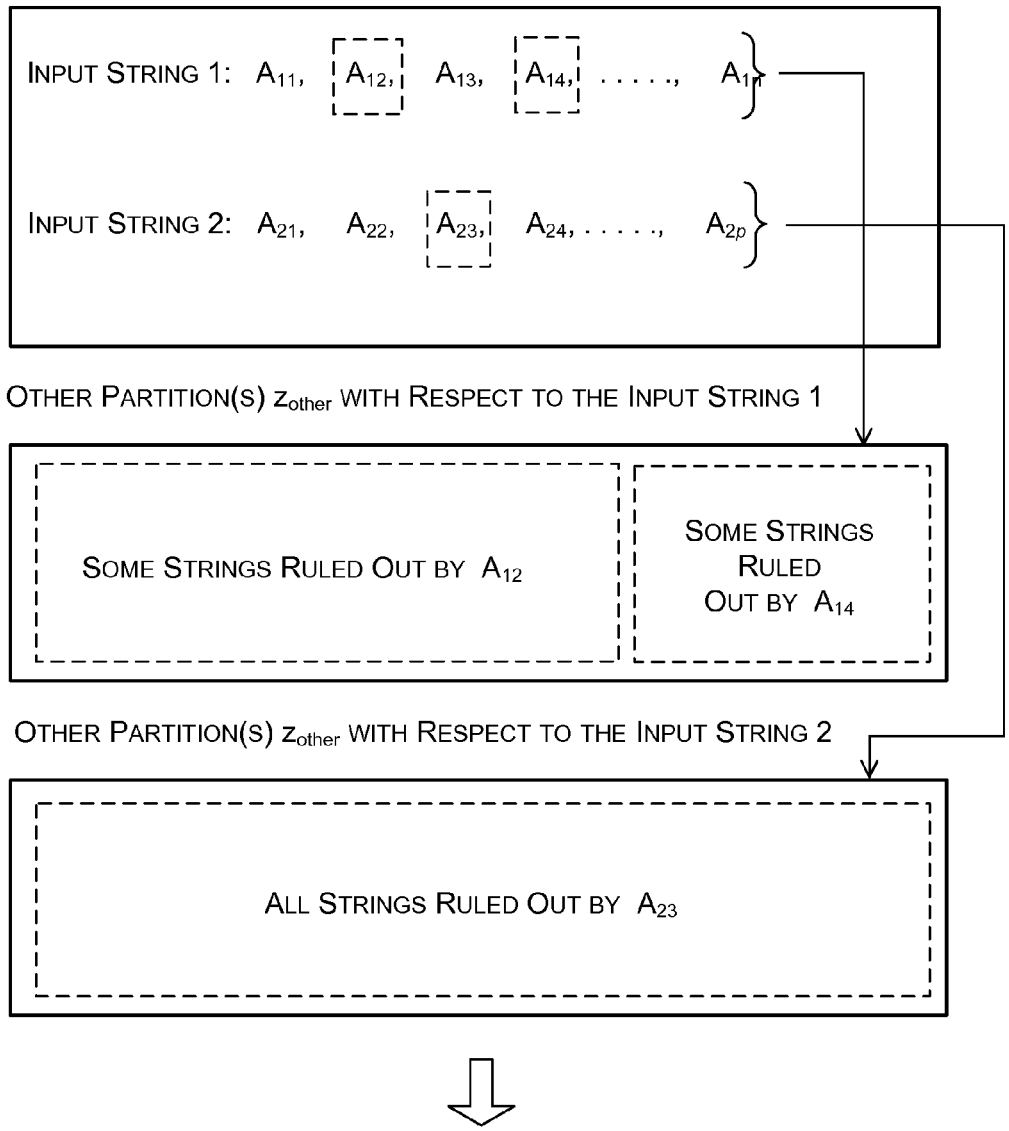
FIG. 23 shows an example of one manner in which the PCS can generate a selection condition for a partition.

FIG. 23 provides an example that serves as a vehicle for explaining one manner of operation of the condition generating module 216. Recall that the purpose of the condition generating module 216 is to generate selection conditions for each partition. A selection condition will cover the input items associated with its own partition (e.g., partition z), yet exclude the input items associated with other partitions (e.g., collectively considered, partitions $z_{other}$). In the example of FIG. 23, the partition z includes two input-output examples, which, in turn, are associated with two respective input strings (input string 1 and input string 2). Assume that the condition generating module 216 is in the process of determining a selection condition ($cond_z$) for the partition z.

The condition generating module 216 first identifies the string features in the input strings for all the input-output examples. That is, these string features correspond to substrings in the input streams. FIG. 23 generically indicates that input string 1 has string features $A_{11}$, $A_{12}$, $A_{13}$, $A_{14}$, ... $A_{1n}$, while input string 2 has string features $A_{21}$, $A_{22}$, $A_{23}$, $A_{24}$, ... $A_{2p}$. Some of the string features of input string 1 may also be found in input string 2.

The condition generating module 216 can construct the selection condition $cond_z$ for partition z by attempting to find a combination of string features in partition z which are not found in other partitions ($z_{other}$). For instance, the condition generating module 216 can determine that string feature $A_{12}$ rules out a subset of input strings in other partitions $z_{other}$, while string feature $A_{14}$ rules out the remaining input strings in the other partitions $z_{other}$. Hence, the condition generating module 216 can determine that the conjunction $d_1 = \pi_{12} \wedge \pi_{14}$ is sufficient to distinguish the first input string from the input strings of other partitions. Here, the notation $\pi_{12}$ and $\pi_{14}$ represents predicates that can be used to identify the string features $A_{12}$ and $A_{14}$, respectively. That is, the predicates correspond to Match constructors which examine an input string for the presence of $A_{12}$ and $A_{14}$, respectively. For input item 2, assume that a single string feature $A_{23}$ (and a corresponding predicate $\pi_{23}$) rules out all of the input strings for the other partitions.

The condition generating module 216 can next form a logical formula for partition z as a whole, to thereby yield the selection condition $cond_z$. More specifically, the selection condition can be represented as $cond_z = (\pi_{12}$ AND $\pi_{14})$ OR $\pi_{14}$. The condition generating module 216 can repeat the above-described analysis for all other partitions to construct the selection conditions for those partitions.

Figure 24:
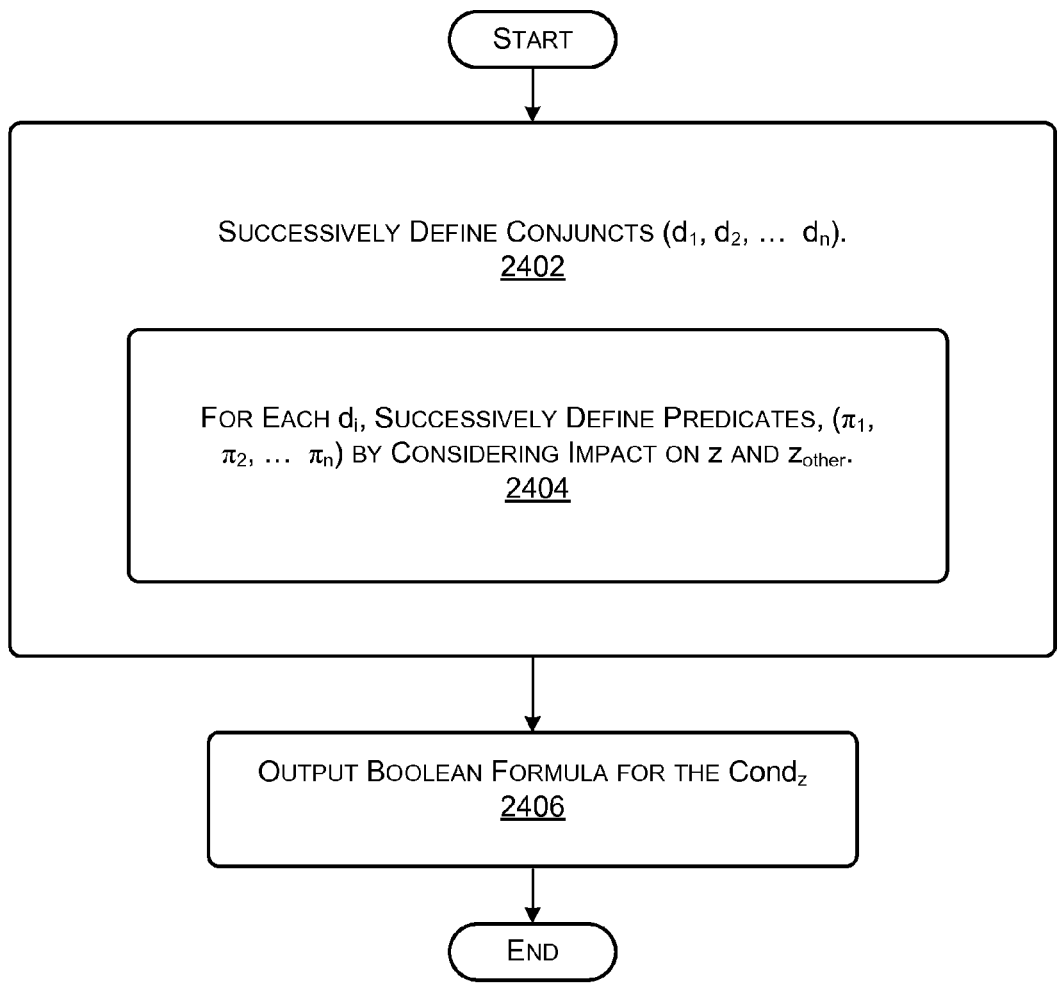
FIG. 24 is a flowchart which complements the example of FIG. 23.

FIG. 24 shows a procedure 2400 which describes one technique by which the condition generating module 216 can produce a selection condition for a particular partition z. In block 2402, the condition generating module 216 successively derives conjuncts ($d_i$) that make up the selection condition $cond_z$ (e.g., $d_1$, $d_2$, . . . $d_n$).

In block 2404, in the effort to derive a particular $d_i$, the condition generating module 216 successively generates the predicates for that conjunct $d_i$. The condition generating module 216 attempts to determine predicates using a greedy approach by: (1) choosing each predicate $\pi$ such that several input-output examples in $z_{other}$ do not satisfy $\pi$; and (2) choosing each predicate $\pi$ such that several input-output examples in partition z satisfy $\pi$. Selection of each successive conjunct d and predicate $\pi$ narrows the field of search for subsequent determinations of conjuncts and predicates, respectively; to address this issue, the condition generating module 216 can perform appropriate accounting that defines the field of search at any given instance.

In block 2406, the condition generating module 216 outputs the Boolean formula associated with the $cond_z$ generated in blocks 2402 and 2404. That is, block 2402 supplies the conjuncts ($d_1$, $d_2$, . . . $d_n$) which are OR'ed together in $cond_z$, whereas block 2406 supplies the predicates for each conjunct $d_i$, which are AND'ed together.

G. Ranking Programs

Figure 25:
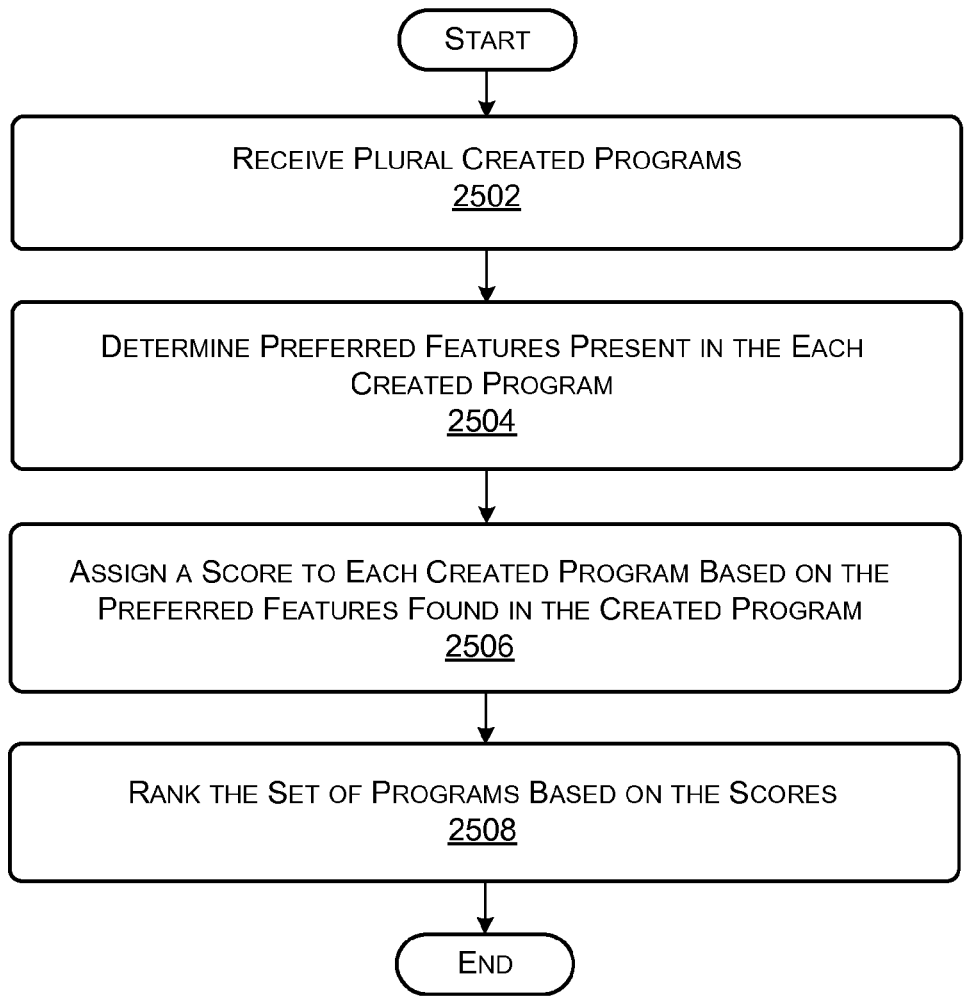
FIG. 25 is a flowchart which describes one way in which the PCS can rank created programs based on the presence of preferred ranking features found in the created programs.

FIG. 25 shows a procedure 2500 by which the ranking module 218 ranks created programs. Alternatively, or in addition, the ranking module 218 can rank subprograms at an earlier stage in the analysis performed by the PCS 102. For example, the ranking module 218 can rank individual representative subprograms produced by the partitioning module 214. To simplify description, however, the ranking module 218 will be described as a tool for ranking created programs, not individual subprograms.

In general, the ranking module 218 attempts to identify the created programs that are most likely to be correct. More specifically, by definition, all of the created programs satisfy the specific set of input-output examples that were used to produce the programs. All of the created programs are correct in that sense. Nevertheless, some of the created programs may more accurately capture the true logic that the user intended, compared to others. This means that different created programs have different likelihoods of providing incorrect results when later applied to new input strings. In view thereof, the ranking module 218 attempts to identify the created programs that are least likely to fail in future use. In addition, in many cases, the ranking modules 218 can identify the most efficient created programs; hence, the results of the ranking module 218 contribute to the overall efficiency of the PCS 102 and the program execution module 116 (which runs the created programs).

In block 2502, the ranking module 218 receives plural created programs. The different created programs use respective strategies to produce the same result (insofar as they have correctly captured the intended logic of the input-output example used to produce the programs).

In block 2504, the ranking module 218 examines each created program to determine whether it includes any preferred features associated with a set of preferred features. That is, any given program may exhibit zero, one, or more preferred features. A preferred feature corresponds to a pattern or characteristic of the created program which is considered desirable (with respect to other less desirable constructions). A preferred feature can also be regarded as a ranking consideration insofar as it influences (e.g., preferably biases) the ranking of created programs.

The ranking module 218 can rely on an extensible list of preferred features. One preferred feature relates to the level of complexity of a created program. That is, the ranking module 218 favors simple programs over more complex programs. Different criteria can be used to gauge complexity. Generally, a first created program may be considered simpler than a second created program if it involves fewer operations than the second created program. For example, complexity may increase in proportion to the number of concatenations in a created program. Complexity may also increase in proportion to the length of token sequences used in regular expressions, and so on.

Another preferred feature relates to the extent to which a created program uses constants. That is, the ranking module 218 will favor a first program over a second program if the first program relies less on the use of constants compared to the second program. For example, in some cases, the ranking module 218 disfavors a created program that overly relies on expressions for printing constant strings, e.g., using the ConstStr constructor. In addition, or alternatively, the ranking module 218 disfavors the use of constants in position expressions, e.g., using the CPos constructor.

Another class of preferred features relates to the manner in which a created program identifies substrings using regular expressions, e.g., using the Substr constructor. This class of features is predicated on the observation that some ways of identifying sub-strings are more reliable than others (meaning that they are less likely to provide incorrect results for different input strings). For example, recall from the description of FIG. 9 that at least some subprograms in the created programs identify a substring using four regular expressions (r1, r2, r3, r4). According to one preferred feature, the ranking module 218 prefers expressions in which either r2 and r3 are empty, or r1 and r4 are empty. Any empty string E may be considered a wildcard that matches any string.

According to another preferred feature relating to regular expressions, the ranking module 218 prefers expressions in which $r_4$ is a counterpart character to $r_1$. For example, $r_4$ may correspond to a right bracket and $r_1$ corresponds to a counterpart left bracket. Other types of preferred pairs include: left and right parentheses; left and right angle brackets; start of string token and end of string token, and so forth.

According to another preferred feature relating to regular expressions, the ranking module 218 prefers expressions in which each of $r_1$ and $r_4$ corresponds to a standard delimiter character (such as a comma, semi-colon, whitespace, hyphen, etc.).

Other implementations of the ranking module 218 can define and adopt other sets of preferred features. The above list of preferred features is illustrative and non-limiting. In other implementations, the ranking module 218 can also assign negative scores to certain patterns that are indicative of disfavored practices. For example, the ranking module 218 can assign negative scores to certain ways of identifying substrings that are unlikely to match the true underling logic intended by the user.

In block 2506, the ranking module 218 assigns a score to each created program based on the preferred features found in the created program. The ranking module 218 can use different strategies to achieve this goal. In one approach, the ranking module 218 generates a score based on a weighted combination of the preferred features found in the created program. The weights convey the relative importance of the respective preferred features. Different implementations can assign different weights to the preferred features based on any environment-specific considerations. In another approach, the ranking module 218 can rely on a trained classifier to generate a score, such as a statistical classifier of any type (trained using any machine-learning procedure), a neural network, etc.

In block 2508, the ranking module 218 ranks the set of programs based on the scores identified in block 2506. That is, the ranking module 218 can order the created programs from most desirable to least desirable based on the scores assigned to the created programs in block 2506.

In addition, the PCS 102 can receive feedback from users that reflects the extent to which the users are satisfied with the created programs produced by the PCS 102. A user may convey his or her level of satisfaction in any implicit manner, such as by making corrections to a created program in a particular way (or declining to make corrections), and/or by performing any other behavior that is indicative of approval/disapproval. Alternatively, or in addition, the user may convey his or her criticism by providing a binary liked/disliked score or a score selected from a given range of scores. Alternatively, or in addition, the user may convey criticism by filling out a survey or the like provided by the PCS 102, and so on.

As noted in Section A, the PCS 102 may be implemented as a web application or the like; in this implementation, the PCS 102 may collect and store feedback from a relatively large group of users who interact with the PCS 102. In a local implementation, the PCS 102 may collect feedback from those users who interact with the local version of the PCS 102. Or that local version of the PCS 102 may receive the feedback from a larger population of users via a centralized feedback-collecting module (not shown).

Upon collection, the PCS 102 can use the feedback to improve the operation of any of its components, such as the subprogram generating module 212, the partitioning module 214, the condition generating module 216, and/or the ranking module 218.

Consider, for instance, one way in which the ranking module 218 may apply user feedback to improve its operation. In one implementation, the ranking module 218 can treat the feedback as additional labeled training data. That is, a pairing of a created program with the user's evaluation of the created program comprises an instance of labeled training data. Any type of machine learning technique can operate on a set of such labeled training data (in optional conjunction with the original training data) to re-generate the model by which the ranking module 218 assigns scores to created programs. The PCS 102 can henceforth generate programs using the updated ranking model. This represents merely one way of leveraging the users' evaluations; other implementations can make other modifications to the ranking module 218 based on the users' evaluations.

H. Representative Processing Functionality

FIG. 26 sets forth illustrative computing functionality 2600 that can be used to implement any aspect of the functions described above. For example, the computing functionality 2600 can be used to implement any aspect of the PCS 102 and/or the program execution module 116. In one case, the computing functionality 2600 may correspond to any type of computing device that includes one or more processing devices. The computing functionality 2600 can be provided at a local and/or remote location with respect to the location of a user. In all cases, the computing functionality 2600 represents one or more physical and tangible processing mechanisms.

The computing functionality 2600 can include volatile and non-volatile memory, such as RAM 2602 and ROM 2604, as well as one or more processing devices 2606 (e.g., one or more CPUs, and/or one or more GPUs, etc.). The computing functionality 2600 also optionally includes various media devices 2608, such as a hard disk module, an optical disk module, and so forth. The computing functionality 2600 can perform various operations identified above when the processing device(s) 2606 executes instructions that are maintained by memory (e.g., RAM 2602, ROM 2604, or elsewhere).

More generally, instructions and other information can be stored on any computer readable medium 2610, including, but not limited to, static memory storage devices, magnetic storage devices, optical storage devices, and so on. The term computer readable medium also encompasses plural storage devices. In all cases, the computer readable medium 2610 represents some form of physical and tangible entity.

The computing functionality 2600 also includes an input/output module 2612 for receiving various inputs (via input modules 2614), and for providing various outputs (via output modules). One particular output mechanism may include a presentation module 2616 and an associated graphical user interface (GUI) 2618. The computing functionality 2600 can also include one or more network interfaces 2620 for exchanging data with other devices via one or more communication conduits 2622. One or more communication buses 2624 communicatively couple the above-described components together.

The communication conduit(s) 2622 can be implemented in any manner, e.g., by a local area network, a wide area network (e.g., the Internet), etc., or any combination thereof. The communication conduit(s) 2622 can include any combination of hardwired links, wireless links, routers, gateway functionality, name servers, etc., governed by any protocol or combination of protocols.

Alternatively, or in addition, any of the functions described in the previous sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed using computing functionality, for generating subprograms that perform string manipulation tasks, comprising:
    receiving and storing input-output examples, the input-output examples providing input strings and corresponding output strings;
    identifying tokens that are used in input strings of the input-output examples, to provide identified tokens;
    identifying a first program-generating constraint;
    determining whether substrings align with natural token boundaries;
    generating, based on the first program-generating constraint, sets of subprograms for the respective input-output examples, each subprogram configured to transform at least one input string associated with a particular input-output example when the substrings align with natural token boundaries, otherwise excluding generation of loop-type expressions and subprograms for the respective input-output examples;
    grouping the sets of subprograms into partitions, yielding at least one representative subprogram for each partition;
    determining whether said generating and grouping provide results that satisfy a predefined success test; and
    repeating said generating and grouping, as governed by a second program-generating constraint, if it is determined that said generating and grouping do not satisfy the predefined success test, the second program generating constraint permitting at least one generation of loop-type expressions or subprograms based on the substrings not aligning with natural token boundaries thereby imposing greater processing complexity and allowing for a larger set of subprograms compared to the first program generating constraint.

2. The method of claim 1, further comprising repeating said generating and grouping at least one additional time, each instance of said generating and grouping being governed by a new program-generating constraint.

3. The method of claim 1, wherein said generating involves generating the subprograms so as to exclude tokens that are not represented by the identified tokens.

4. The method of claim 3, wherein said generating also entails:
    identifying tokens that are used in additional input strings that do form part of the input-output examples, to provide additional identified tokens,
    wherein said generating also involves generating the subprograms so as to exclude tokens that are not represented by the additional identified tokens.

5. The method of claim 1, wherein said generating involves representing each set of subprograms, associated with an input-output example, as a graph.

6. The method of claim 5, wherein said grouping comprises forming an intersection between a first graph and a second graph, the first graph being associated with a first input-output example that includes at least one first input string and a first output string, and the second graph being associated with a second input-output example that includes at least one second input string and a second output string, said forming comprising:
    projecting the first graph onto the second input-output example, by running subprograms in the first graph for said at least one second input string, to provide a first projection-modified graph;
    projecting the second graph onto the first input-output example, by running subprograms in the second graph for said at least one first input string, to provide a second projection-modified graph; and taking the union of the first projection-modified graph and the second projection-modified graph.

7. The method of claim 6, wherein said projecting of the first graph onto the second input-output example entails removing an incorrect first-graph expression, associated with a particular edge in the first graph, if the first-graph expression produces a result that is inconsistent with the second output item, and wherein said projecting of the second graph onto the first input-output example entails removing an incorrect second-graph expression, associated with a particular edge in the second graph, if the second-graph expression produces a result that is inconsistent with the first output item.

8. The method of claim 1, the method further comprising:

determining selection conditions for the respective partitions, each selection condition covering input strings associated with a particular partition while excluding input strings associated with other partitions;

providing created programs based on the selection conditions, together with representative subprograms provided by said grouping; and ranking the created programs based on at least one ranking consideration.

9. The method of claim 8, wherein at least some representative subprograms in the created programs identify a substring position using four regular expressions ($r_1$, $r_2$, $r_3$, $r_4$), and wherein said at least one ranking consideration includes:

a first ranking consideration that preferentially biases a subprogram in which either $r_2$ and $r_3$ are empty, or $r_1$ and $r_4$ are empty;

a second ranking consideration that preferentially biases a subprogram in which $r_4$ is a counterpart character to $r_1$; and a third ranking consideration that preferentially biases a subprogram in which $r_1$ and $r_4$ each corresponds to standard delimiter characters.

10. The method of claim 8, wherein said ranking comprises:

assigning a score to each created program based on presence of any preferred features in the created program; and ranking the created programs based on respective scores assigned to the created programs.

11. A computer readable storage memory comprising computer readable instructions stored thereon that, responsive to execution by one or more processing devices, are configured to:

receive input-output examples, the input-output examples providing input strings and corresponding output strings;

identify tokens that are used in the input strings of the input-output examples, to provide identified tokens;

identify a first program-generating constraint;

determine whether substrings align with natural token boundaries;

generate, based on the first program generating constraint, first sets of subprograms for the respective input-output examples, each subprogram configured to transform at least one input string associated with a particular input-output example into an output string associated with the particular input-output example;

determine whether the generating provides results that satisfy a predefined success test;

if it is determined that the generating does not satisfy the predefined success test, generate, based on a second program generating constraint, second sets of programs for the respective input-output examples, the first program-generating constraint excluding generation of loop-type expressions and excluding generation of subprograms based on a consideration of substrings that do not align with natural token boundaries, and the second program-generating constraint permitting at least one of generation of loop-type expressions or generation of subprograms based on a consideration of substrings that do not align with natural token boundaries.

12. The computer readable storage memory of claim 11, wherein at least some of the subprograms use regular expressions to identify substrings, and wherein the regular expressions exclude tokens that are not represented by the identified tokens.

13. A system comprising:

one or more processors; and one or more memories comprising instructions stored thereon that, responsive to execution by the one or more processors, perform operations comprising:

receiving and storing input-output examples, the input-output examples providing input strings and corresponding output strings;

identifying tokens that are used in input strings of the input-output examples, to provide identified tokens;

identifying a first program-generating constraint;

determining whether substrings align with natural token boundaries;

generating, based on the first program generating constraint, sets of subprograms for the respective input-output examples, the first program-generating constraint excluding generation of loop-type expressions and excluding generation of subprograms based on a consideration of substrings that do not align with natural token boundaries;

determining whether said generating provide results that satisfy a predefined success test; and repeating said generating, as governed by a second program-generating constraint, if it is determined that said generating does not satisfy the predefined success test, the second program-generating constraint permitting at least one of generation of loop-type expressions or generation of subprograms based on a consideration of substrings that do not align with natural token boundaries.

* * * * *